(12) United States Patent
Chen

(10) Patent No.: US 8,576,471 B2
(45) Date of Patent: Nov. 5, 2013

(54) LIQUID CASTING COMPOSITIONS, PRODUCTION PROCESSES AND PHOTOCHROMIC OPTICAL ELEMENTS

(75) Inventor: Fang Chen, Hallett Cove (AU)

(73) Assignee: Carl Zeiss Vision Australia Holdings Limited, Lonsdale, South Australia (AU)

(*) Notice: Subject to any disclaimer, the term of this patent is extended or adjusted under 35 U.S.C. 154(b) by 22 days.

(21) Appl. No.: 13/257,014

(22) PCT Filed: Mar. 16, 2010

(86) PCT No.: PCT/AU2010/000297
§ 371 (c)(1),
(2), (4) Date: Sep. 29, 2011

(87) PCT Pub. No.: WO2010/105289
PCT Pub. Date: Sep. 23, 2010

(65) Prior Publication Data
US 2012/0268828 A1    Oct. 25, 2012

(30) Foreign Application Priority Data

Mar. 16, 2009 (AU) ................................ 2009901119

(51) Int. Cl.
*G02F 1/07* (2006.01)
*G02B 5/23* (2006.01)

(52) U.S. Cl.
USPC .......................................... 359/241; 252/586

(58) Field of Classification Search
USPC ............................ 359/241, 243, 244; 252/586
See application file for complete search history.

(56) References Cited

U.S. PATENT DOCUMENTS

| | | |
|---|---|---|
| 3,565,814 A | 2/1971 | Pellon |
| 5,373,033 A | 12/1994 | Toh et al. |
| 5,696,621 A | 12/1997 | Nakanishi et al. |
| 5,835,428 A | 11/1998 | Kobayashi |
| 6,365,312 B1 | 4/2002 | Foucher et al. |
| 6,811,830 B2 | 11/2004 | Toh et al. |
| 2003/0043447 A1 | 3/2003 | Toh et al. |
| 2005/0116381 A1 | 6/2005 | Wong et al. |
| 2005/0258408 A1 | 11/2005 | Molock et al. |
| 2008/0311287 A1 | 12/2008 | Chen |

FOREIGN PATENT DOCUMENTS

| | | |
|---|---|---|
| CN | 1596291 | 3/2005 |
| JP | 3-231908 A | 10/1991 |
| JP | 5-78507 A | 3/1993 |
| JP | 10-338869 A | 12/1998 |
| JP | 2003-528946 A | 9/2003 |
| JP | 2004-161825 A | 6/2004 |
| JP | 2004-224891 A | 8/2004 |
| JP | 2006-193558 A | 7/2006 |
| JP | 2008-297553 A | 12/2008 |
| WO | 97/02574 A1 | 1/1997 |
| WO | 01/72851 A1 | 10/2001 |
| WO | 03/011926 A1 | 2/2003 |
| WO | WO 2003/038009 A1 | 5/2003 |
| WO | WO 2008/153595 A1 | 12/2008 |

OTHER PUBLICATIONS

International Search Report mailed May 14, 2010 for International Application No. PCT/AU2010/000297.
International Preliminary Report on Patentability dated Nov. 12, 2010 for International Application No. PCT/AU2010/000297.
Examination Report for Co-Pending Chinese Application dated Nov. 5, 2012.
Office Action from the Japan Patent Office dated Jul. 16, 2013, issued in corresponding Japanese Patent Application No. 2012-500003, with English translation thereof. (9 pages).

*Primary Examiner* — William Choi
(74) *Attorney, Agent, or Firm* — Buchanan Ingersoll & Rooney PC

(57) ABSTRACT

The present invention provides a liquid casting composition for producing photochromic optical elements, the composition including: (i) an acrylate or methacrylate monomer; (ii) a photochromic compound; (iii) a terpinolene-based radical chain transfer agent; and (iv) a thermal free radical initiator. Also provided are methods for producing photochromic optical elements using the liquid casting composition and photochromic optical elements produced thereby. The photochromic optical elements include, for example, ophthalmic lenses.

44 Claims, No Drawings

LIQUID CASTING COMPOSITIONS, PRODUCTION PROCESSES AND PHOTOCHROMIC OPTICAL ELEMENTS

PRIORITY CLAIM

This application claims priority to Australian provisional patent application 2009901119 filed 16 Mar. 2009, the contents of which are hereby incorporated by reference.

FIELD

The present invention relates to liquid casting compositions for producing photochromic optical elements, processes for producing optical elements containing the composition and photochromic optical elements produced using the compositions and/or processes.

BACKGROUND

Photochromic optical elements, such as lenses, that darken and fade automatically in response to changing light are in widespread use. The optical elements contain photochromic compounds that change from a faded ground state to a darkened activated state upon exposure to sunlight. The transition from the ground state to the activated state is reversible so that the compounds revert to the transparent (or minimally coloured) ground state when removed from sunlight.

Photochromic optical elements are typically formed by including a photochromic compound within the substrate of the optical element, or on a surface of the optical element, and the optical elements are typically formed either by including the photochromic compound directly into the optical element substrate or by coating the optical element with a layer containing the photochromic compound. From a manufacturing point of view, it is preferable for the photochromic compound to be within the substrate of the optical element because it is cheaper to include the photochromic compound in the substrate during manufacture than it is to coat the optical element with a layer containing the photochromic compound.

The inclusion of a photochromic compound in the substrate of an optical element is usually achieved in one of two ways: (i) by imbibing the photochromic compound into a formed or semi-formed optical element (the so called 'imbibition' method); or (ii) by including the photochromic compound into a casting composition which includes a polymerisable monomer, and then curing the composition to produce the optical element (the so called 'cast-in' method). In either case, it is widely recognised that inclusion of photochromic compounds into optical elements is difficult. For example, it is difficult to control the amount of photochromic compound introduced into an optical element using the imbibition method. In contrast, it is easier to control the amount of photochromic compound in the optical element using the cast-in method but the photochromic compound is often adversely affected by the polymerisation conditions with the result being degradation of the photochromic compound and poor photochromic performance of the resultant lens element.

A further consideration in the manufacture of photochromic optical elements is the performance of the photochromic compound when it is in the optical element substrate. Photochromic optical elements are generally expected to exhibit rapid conversion between faded and darkened states so that they react as rapidly as possible to any change in lighting conditions. It is known that the chemical and physical properties of the substrate matrix that surrounds the photochromic compound strongly influences the photochromic properties, such as the darkening and fading rate and the darkening depth.

Many existing processes for producing photochromic optical elements also result in sub-standard quality optical elements. For example, many processes result in optical elements that exhibit cracks and/or surface defects. This is often the case when the liquid casting composition is used to make optical elements of different thicknesses. For example, a composition which may be successfully used for a 2 mm plano lens may produce a 10 mm thick semifinished lens that is of sub-standard quality. It is therefore desirable to have a polymerisable composition that is robust enough to produce photochromic optical elements of different thicknesses without compromising the quality of the optical element.

From the foregoing description it is evident that many factors need to be considered in the manufacture of commercially viable photochromic optical elements. There is a need for improved and/or alternative liquid casting compositions and processes for forming polymeric photochromic optical elements.

Reference to any prior art in this specification is not, and should not be taken as, an acknowledgment or any form of suggestion that this prior art forms part of the common general knowledge in any country.

SUMMARY

The present invention arises from our finding that by using a particular liquid casting composition it is possible to produce high quality, high performance photochromic optical elements.

The present invention provides a liquid casting composition for producing photochromic optical elements, the composition including:

(i) an acrylate or methacrylate monomer, (ii) a photochromic compound, (iii) a terpinolene-based radical chain transfer agent, and (iv) a thermal free radical initiator.

The term "liquid casting composition", as used herein, is intended to mean a polymerisable casting composition that may be added to a mould and subjected to a thermal polymerisation reaction to form a solid photochromic optical element.

A combination of an acrylate or methacrylate monomer and a terpinolene-based radical chain transfer agent is advantageous because the acrylate or methacrylate monomer is relatively easy to polymerise and, therefore, any effect of the photochromic compound on the polymerisation is minimised, and the terpinolene chain transfer agent modulates the polymerisation kinetics so that the optical element that is formed has adequate softness to allow the photochromic compound to switch rapidly between the darkened and faded states, but adequate hardness so that the optical element can be coated with coating layers. Furthermore, the terpinolene chain transfer agent controls the polymerisation reaction speed to achieve uniform and striation free optical elements.

In some embodiments, the acrylate or methacrylate monomer may include a urethane acrylate or methacrylate monomer. For example, the urethane acrylate or methacrylate monomer may include any one or more monomers selected from the group consisting of: NK Oligo U-4HA, NK Oligo U-6HA, and a monomer of the following structure:

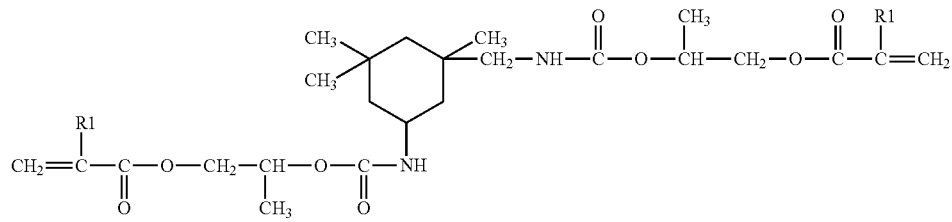

wherein R1 represents a hydrogen atom or a methyl group.

The inclusion of a urethane acrylate or methacrylate monomer in the composition may improve one or more properties of an optical element formed from the composition. For example, the urethane acrylate or methacrylate monomer may improve the impact strength of the optical element that is formed.

The composition may also include a light stabiliser and/or a UV absorber and may also include an antioxidant.

Ideally, the composition will be suitable for forming photochromic optical elements with a Barcol hardness of between 60 and 85, between 60 and 80, or between 70 and 80. Barcol hardness is measured by using the Barcol hardness test, which measures the indentation hardness of materials though the depth of penetration of an indentor and comparison with a reference material. The test is known within the art and is governed by ASTM D 2583 (07 Standard Test Method for Indentation Hardness of Rigid Plastics by Means of a Barcol Impressor). In some embodiments, the Barcol hardness test may utilise a Model GYZJ 935 Barcol Testing Rig and Test Discs stamped 87/89 (GYZJ 69). These Test Discs have a Barcol reference hardness of 87/89 and are used as a reference for the test samples.

The composition may also be suitable for forming photochromic optical elements with a photochromic $T_{3/4}$ fade time less than 300 seconds or a photochromic $T_{3/4}$ fade time less than 250 seconds.

Further, the composition may be suitable for forming first and second crack-free and surface defect-free photochromic optical elements with centre thickness between 1.5 mm and 17 mm, wherein the centre thickness of the first optical element is at least 6 mm or at least 12 mm greater than that of the second optical element. In this regard, the same composition may be used to produce optical elements of different thickness ranges, which can simplify production. For example, in some embodiments, the same composition may be used to produce any one or more of 2 mm plano lenses, −2.00 stock lenses, +4.00 stock lenses, 10 mm thick semi-finished lenses and 15 mm thick semifinished lenses.

The present invention also provides a process for the manufacture of a photochromic optical element, the process including:
 introducing the composition described above into a mould; and
 subjecting the composition to a thermal curing step to provide a solid photochromic optical element.

The present invention also includes an optical element formed from a composition as described herein or according to a process as described herein.

In some embodiments, the optical element is a lens, such as an ophthalmic lens.

General Description

As discussed, the present invention provides liquid casting compositions for producing photochromic optical elements, processes for producing optical elements containing the compositions and photochromic optical elements produced using the compositions and/or processes. The optical element may be any optical transparent article, such as lenses (including ophthalmic lenses and sunglass lenses), lens blanks, window panes, transparent display panels, and the like. In some embodiments, the optical element is a lens element. The term "lens element" as used herein refers to a finished or unfinished lens or lens blank manufactured from an optically transparent plastic material. In some embodiments, the lens element is an ophthalmic lens. Ophthalmic lenses can be used in sunglasses, fashion lenses, non-prescription (piano) lenses, prescription lenses (finished and semi-finished), sport masks, face shields and goggles. Whilst the present invention was developed in the context of manufacturing photochromic ophthalmic lenses, it will be evident that the processes and compositions described herein could also be used to form other transparent photochromic articles.

The optical element is formed from the composition, which includes (i) an acrylate or methacrylate monomer, (ii) a photochromic compound, (iii) a terpinolene-based radical chain transfer agent, and (iv) a thermal free radical initiator. The composition is introduced into a mould and then thermally cured to provide a solid photochromic optical element.

The acrylate or methacrylate monomer may include one or more monomers selected from the group consisting of: alkylene diacrylates, such as decanediol diacrylate; poly(alkyleneoxide) diacrylates such as NK Ester A200 (polyethylene glycol 200 diacrylate), NK Ester A400 (polyethylene glycol 400 diacrylate), NK Ester A600 (polyethylene glycol 600 diacrylate), NK Ester APG-200 (tripropylene glycol diacrylate) and NK Ester APG-400 (polypropylene glycol 400 diacrylate); poly(alkyleneoxide) dimethacrylates such as NK Ester 14G, NK Ester 9G, 4g, and NK Ester 2G; and urethane acrylates or methacrylates such as NK Oligo U-4HA, NK Oligo U-6HA, NK Oligo U-2PPA. In some embodiments, the acrylate or methacrylate monomer is selected from the group consisting of: NK Ester 14G, NK Ester 9G, NK Ester 2G, and ethoxylated bisphenol-A dimethacrylate (having between 1 and 10 ethoxy groups per molecule). Optionally, the acrylate or methacrylate monomer also contains a urethane acrylate or methacrylate monomer such as NK Oligo U-4HA, NK Oligo U-6HA or NK Oligo U-2PPA.

It will be appreciated that the present invention contemplates compounds including a range of suitable acrylates and methacrylates. For example, the acrylate or methacrylate may include one or more selected from the group consisting of: Ethoxylated o-phenylphenol Acrylate, Methoxy Polyethylene Glycol 400 Acrylate(EO 9 mol), Methoxy Polyethylene Glycol 550 Acrylate(EO 13 mol), Phenoxypolyethyleneglycol Acrylate, Glycidyl Acrylate, Lauryl Methacrylate, Isostearyl Acrylate, 2-Hydroxy-1-Acryloxy-3-Methadryloxy Propane, Polyethylene Glycol 200 Diacrylate, Polyethylene Glycol 400 Diacrylate, Polypropylene Glycol 600 Diacrylate, Propoxylated Ethoxylated Bis-A Diacrylate(PO12/EO6), 2.2 Bis[4-(AcryloxyPolyethoxy]Phenyl]Propane(EO3 mol), 2.2Bis[4-(AcryloxyPolyethoxy]Phenyl]Propane(EO10 mol), 2.2 Bis[4-(Acryloxy Polyethoxy]Phenyl]Propane (EO20 mol), 2.2 Bis[4-(Acryloxy Diethoxy]Phenyl]Propane (EO4 mol), 9,9-Bis[4-(2-acryloyloxy ethoxy)phenyl]fluorine, 2.2 Bis[4-(Acryloxy Polypropoxy]Phenyl]Propane (PO3 mol), Tricylodecane Dimethanol Diacrylate, 1,12-Dodecanediol Diacrylate, 1,10-Decanediol Diacrylate, 1,6-Hexanediol Diacrylate, 1,9-Nonanedio Diacrylate, Dipropylene Glycol Diacrylate, Tripropylene Glycol Diacrylate, Polypropylene Glycol #400 Diacrylate, Polypropylene Glycol #700 Diacrylate, Tris(2-acryloxyethyl) Isocyanulate, ε-Caprolactone ethoxylated isocyanuric acid triacrylate and Ethoxylated isocyanuric Acid Triacrylate, Ethoxylated Glycerine Triacrylate(EO9 mol), Ethoxylated Glycerine Triacrylate(EO20 mol), Pentaerythritol Triacrylate, Trimethylol Propane Triacrylate, Ditrimethylol Propane Tetraacrylate, Ethoxylated Pentaerythritol tetraacrylate (EO35 mol), Tetramethylol Methane Tetaacrylate, Di-pentaerythritol Polyacrylate, Di-pentaerythritol Polyacrylate, β-Methacryloyloxyethyl Hydrogen Phthalate, Methoxy Polyethylene Glycol 400 Methacrylate(EO 9 mol), Methoxy Polyethylene Glycol 1000 Methacrylate(EO 23 mol), Phenoxy Ethyl Methacrylate(EO 1 mol), Glycidyl Methacrylate, Lauryl Methacrylate, Stearyl Methacrylate, Isostearyl Methacrylate, Ethylene Glycol Dimethacrylate, Diethylene Glycol Dimethacrylate, Triethyleneglycol Dimethacrylate, Polyethylene Glycol 200 Dimethacrylate, Polyethylene Glycol 400 Dimethacrylate, Polypropylene glycol 400 Dimethacrylate, Polypropylene Glycol 600 Dimethacrlate, Polyethylene Glycol 1000 Dimethacrylate, 2.2 Bis[4-(Methacryloxy Ethoxy] Phenyl]Propane(EO2.3 mol), 2.2 Bis[4-(Methacryloxy Ethoxy]Phenyl]Propane (EO2.6 mol), 2.2 Bis[4-(Methacryloxy Diethoxy]Phenyl]Propane(EO4 mol), 2.2 Bis[4-(Methacryloxy Polyethoxy]Phenyl]Propane(EO10 mol), 2.2 Bis[4-(Methacryloxy Polyethoxy]Phenyl]Propane (EO17 mol), 2.2 Bis[4-(Methacryloxy Polyethoxy]Phenyl]Propane(EO30 mol), Tricyclodecane Dimethanol Dimethacrylate, 1,12-Dodecanediol Dimethacrylate, 1,10-Decanediol Di Methacrylate, 1,6-Hexane Diol Dimethacrylate, 1.9-Nonanediol Di Methacrylate, Neopentyl Glycol Dimethacrylate, Ethoxylated Polypropyreneglycol Dimethacrylate(PO12/EO6), 2-Hydroxy 1,3-Dimethacryloxy Propane, Polypropylene Glycol #400 Dimethacylate, Tris(2-methacryloxyethyl) Isocyanulate, ε-Caprolactone Ethoxylated Isocyanuric Acid Trimethacrylate, Ethoxylated Isocyanuric Acid Trimethacrylate, Ethoxylated Glycerine Trimethacrylate(EO9 mol), Ethoxylated Glycerine Trimethacrylate(EO20 mol), Pentaerythritol Trimethacrylate, Trimethylol Propane Trimethacrylate, Ditrimethylol Propane Tetramethacrylate, Ethoxylated Pentaerythritol Tetramethacrylate(EO35 mol), Tetramethylol Methane Tetamethacrylate, Di-pentaerythritol Polymethacrylate, Di-pentaerythritol Polyacrylate, NK oligo U-4HA, NK oligo U-6HA, NK oligo U-200PA, NK oligo UA-122P, NK oligo UA-4200, NK oligo U-2PPA, Urethane Acrylate, Urethane Methacrylate, Epoxy Acrylate, Epoxy Methacrylate, Polybutadiene Dimethacrylate, Polybutadiene Diacrylate, and Polyester Acrylate.

Exemplary examples of the acrylate or methacrylate monomer include any one or more monomers selected from the group consisting of: NK Ester 14G, NK Ester 9G, NK Ester 2G, 1,12-Dodecanediol Dimethacrylate, 1.10-Decanediol Di Methacrylate, 1.9-Nonanediol Di Methacrylate (Light Ester 1.9 ND), Lauryl (meth)acrylate (NK Ester LA), Isostearyl (meth)acrylate, and ethoxylated bisphenol-A dimethacrylate (having between 1 and 10 ethoxy groups per molecule).

The nature of the optical element substrate polymer can have an effect on the performance of photochromic compounds incorporated therein. For example, certain polymers may not have sufficient free volume or flexibility to allow the electrocyclic mechanism by which the photochromic compounds change colour to occur sufficiently. However, polymers that do have sufficient free volume or flexibility may not produce an optical element of sufficient hardness. As a result, it is difficult to produce photochromic optical elements having commercially acceptable photochromic speed and commercially acceptable hardness.

We have found that a combination of:
(i) a relatively hard polymer formed from a polyalkylene oxide acrylate or methacrylate monomer;
(ii) a relatively flexible polymer formed from a polyalkylene oxide acrylate or methacrylate monomer; and
(iii) a urethane acrylate or methacrylate monomer
provides an optical element substrate having sufficient flexibility to allow for commercially acceptable photochromic speeds whilst also having commercially acceptable hardness and impact strength.

Examples of polyalkylene oxide acrylate or methacrylate monomers that form relatively hard polymers include those with low numbers of alkylene oxide units per monomer unit (e.g. monomers with 4 or less alkylene oxide units per monomer unit, such as diethyleneglycol dimethacrylate). Examples of polyalkylene oxide acrylate or methacrylate monomers that form relatively flexible polymers include those with high numbers of alkylene oxide units per monomer unit (e.g. 6 or more, 9 or more, or 14 or more alkylene oxide units per monomer unit, such as NK Ester 9G, NK Ester 14G and Light Ester 14 EG). It will be appreciated that some polyalkylene oxide acrylate or methacrylate monomers with alkylene oxide units within these specific ranges may not result in relatively hard or relatively flexible polymers and some monomers with alkylene oxide units outside of these specific ranges may result in relatively hard or relatively flexible polymers. However, a person skilled in the art would be able to determine whether a specific polyalkylene oxide acrylate or methacrylate monomer forms a relatively hard or relatively flexible polymer by routine trial and error, especially by comparison with the examples provided.

Alternatively, we have found that a combination of:
(i) a relatively flexible polymer formed from a polyalkylene oxide acrylate or methacrylate monomer; a polypropylene glycol acrylate or methacrylate monomer; a lauryl acrylate or methacrylate monomer; or a isostearyl acrylate or methacrylate monomer;
(ii) a relatively hard polymer formed from a bisphenol A ethoxylated di acrylate or methacryalte; and
(iii) a urethane acrylate or methacrylate monomer
provides an optical element substrate having sufficient flexibility to allow for commercially acceptable photochromic speeds whilst also having commercially acceptable hardness and impact strength.

Examples of polyalkylene oxide acrylate or methacrylate monomers that form relatively flexible polymers include those with high numbers of alkylene oxide units per monomer unit (e.g. 6 or more, 9 or more, or 14 or more alkylene oxide units per monomer unit, such as NK Ester 9G, NK Ester 14G and Light Ester 14 EG). It will be appreciated that some polyalkylene oxide acrylate or methacrylate monomers with alkylene oxide units within these specific ranges may not result in relatively flexible polymers and some monomers with alkylene oxide units outside of these specific ranges may result in relatively flexible polymers. However, a person skilled in the art would be able to determine whether a specific polyalkylene oxide acrylate or methacrylate monomer forms a relatively flexible polymer by routine trial and error, especially by comparison with the examples provided.

The ratios of monomers used may be varied to produce an optical element of a desired hardness.

As discussed above, the composition may be suitable for forming photochromic optical elements with a Barcol hardness of between 60 and 85, between 60 and 80, or between 70 and 80. Accordingly, the combination of monomers may be selected to provide an optical element with a Barcol hardness that falls within any of these ranges.

An example of a composition in accordance with the present invention may include:

30 to 60 parts by weight of a polymerisable composition polyethylene glycol di(meth)acrylate monomer of formula (II):

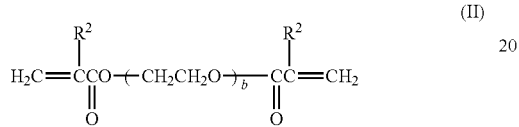

wherein $R^2$ is a hydrogen atom or a methyl group, and b is an integer selected from the group consisting of 5 to 20, 30 to 60 parts by weight of a bisphenol A ethoxylated di(meth)acrylate;

0 to 40 parts by weight of the polymerisable composition of a urethane (meth)acrylate monomer;

0.02 to 0.2 parts by weight of the polymerisable composition of the photochromic compound;

0.1 to 1.0 parts by weight of the polymerisable composition of the terpinolene-based radical chain transfer agent; and 0.1 to 1.5 parts by weight of the polymerisable composition of the thermal free radical initiator.

Alternatively, the composition may include:

20 to 60 parts by weight of the polymerisable composition of a polyethylene glycol di(meth)acrylate monomer of formula (I):

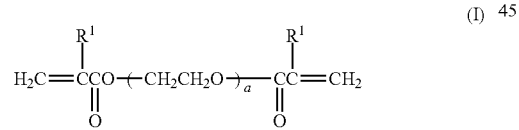

wherein $R^1$ is a hydrogen atom or a methyl group, and a is an integer selected from the group consisting of 2 to 4;

15 to 60 parts by weight of the polymerisable composition of a polyethylene glycol di(meth)acrylate monomer of formula (II):

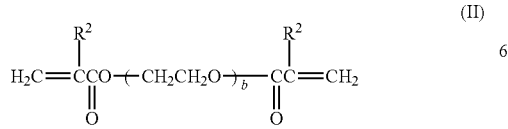

wherein $R^2$ is a hydrogen atom or a methyl group, and b is an integer selected from the group consisting of 5 to 20;

0 to 40 parts by weight of the polymerisable composition of a urethane (meth)acrylate monomer;

0.02 to 0.2 parts by weight of the polymerisable composition of the photochromic compound;

0.1 to 1.0 parts by weight of the polymerisable composition of the terpinolene-based radical chain transfer agent; and 0.1 to 1.5 parts by weight of the polymerisable composition of the thermal free radical initiator.

The composition may further include 5 to 20% parts by weight of the polymerisable composition of 1.9 nonanediol dimethacrylate or may further include 5 to 20% parts by weight of the polymerisable composition of n-Lauryl methacrylate.

As a further example, the composition may include:

30 to 50 parts by weight of the polymerisable composition of a polyethylene glycol di(meth)acrylate monomer of formula (I):

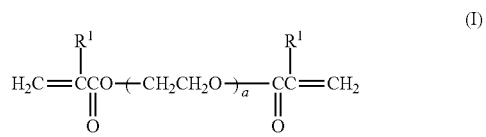

wherein $R^1$ is a hydrogen atom or a methyl group, and a is an integer selected from the group consisting of 2 to 4;

30 to 60 parts by weight of the polymerisable composition of a polypropylene glycol di(meth)acrylate monomer of formula (II):

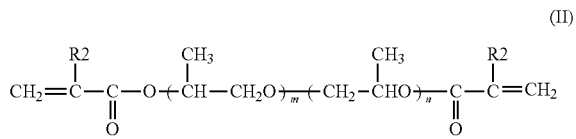

wherein $R^2$ represents a hydrogen atom or a methyl group, and m and n are integers that together add up to 7;

0 to 40 parts by weight of the polymerisable composition of a urethane (meth)acrylate monomer;

0.02 to 0.2 parts by weight of the polymerisable composition of the photochromic compound;

0.1 to 1.0 parts by weight of the polymerisable composition of the terpinolene-based radical chain transfer agent; and 0.1 to 1.5 parts by weight of the polymerisable composition of the thermal free radical initiator.

Now that some exemplary examples of compounds have been described, attention will be directed to describing some of the components of the compounds in detail.

The photochromic compound may be chosen from a range compounds that are known and have been used in applications in which a sunlight-induced reversible colour change or darkening is desired. Known chemical classes of photochromic compounds include naphthpyrans, anthraquinones, phthalocyanines, spiro-oxazines, chromenes, pyrans, fulgides, spiro-naphthoxazines, spiropyrans, triarylmethanes, stilbenes, azastilbenes, nitrones, spiropyrans, spiro-oxazines, quinones. Typically, the photochromic compounds have a visible lambda max of from 400 nm to 700 nm.

Examples of photochromic compounds may be selected from the group consisting of:

1,3-dihydrospiro[2H-anthra[2,3-d]imidazole-2,1'-cyclohexane]-5,10-dione;
1,3-dihydrospiro[2H-anthra[2,3-d]imidazole-2,1'-cyclohexane]-6,11-dione;
1,3-dihydro-4-(phenylthio)spiro[2H-anthra-1',2-diimidazole-2,1'-cyclohexane-6,11-dione;
1,3-dihydrospiro[2-H-anthra[1,2-d]imidazole-2,1'-cycloheptane]-6,11-dione-1,3,3-trimethylspiroindole-2,3'-[3H]naphtho[2,1-b]-1,4-oxazine]2-methyl-3,3'-spiro-bi-[3H-naphtho[2,1-bipyran](2-Me);
2-phenyl-3-methyl-7-methoxy-8'-nitrospiro[4H]-1-benzopyran-4,3'-[3H]-naphtho[2,1-]pyran;
spiro[2H-1-benzopyran-2,9'-xanthene];
8-methoxy-1',3'-dimethylspiro(2H-1-benzopyran-2,2'-(1'H)-quinoline;
2,2'-spiro-bi-[2H-1-benzopyran];
5'-amino-1,3',3'-trimethylspiro[2H-1-benzopyran-2,2'-indoline;
ethyl-.beta.-methyl-.beta.-(3',3'-dimethyl-6-nitrospiro(2H-1-benzopyran-2,2'-indolin-1'-yl)-propenoate;
(1,3-propanediyl)bis[3',3'-dimethyl-6-nitrospiro[2H-1-benzopyran-2,2'-indoline];
3,3'-dimethyl-6-nitrospiro[2H-1-benzopyrao-2,2'-benzoxazoline];
6'-methylthio-3,3'-dimethyl-8-methoxy-6-nitrospiro[2H-1-benzopyran-2,2'-benzothiozoline];
(1,2-ethanediyl)bis[8-methoxy-3-methyl-6-nitrospiro[2H-1-benzopyran-2,2'-benzothiozoline];
N-N'-bis(3,3'-dimethyl-6-nitrospiro[2H-1-benzopyran-2,2'(3'H)-benzothioazol-6'-yl)decanediamide];
alpha.-(2,5-dimethyl-3-furyl)ethylidene(Z)-ethylidenesuccinicanhydride;
.alpha.-(2,5-dimethyl-3-furyl)-.alpha.',.delta.-dimethylfulgide;
2,5-diphenyl-4-(2'-chlorophenyl)imidazole;
(2',4'-dinitrophenyl)methyl]-1H-benzimidazole;
N-N-diethyl-2-phenyl-2H-phenanthro[9,10-d]imidazol-2-amine;
2-nitro-3-aminofluoren 2-amino-4-(2'-furanyl)-6H-1,3-thiazine-6-thione.

Commercial photochromic compounds may also be used. Examples of commercial photochromic compounds may include any one or more selected from the group consisting of: CNN11, CNN12, CNN13, CNN14, CNN15, CNN16, CNN17 (from Tokuyama), Reversacol Midnight Gray, Reversacol Pacific Blue, Reversacol Sunflower, and Reversacol Corn Yellow (from James Robinson). Other known commercial photochromic compounds may also be used.

Optionally, a mixture of two or more of the photochromic compounds may be used. By using appropriate mixtures of photochromic compounds, it is possible to obtain specific activated colours.

The terpinolene-based radical chain transfer agent functions as a polymerisation moderator and, as such, it helps to minimise the formation of distortions, such as striations, in the optical elements that are produced. The term "terpinolene-based radical chain transfer agent" as used herein is intended to include within its scope terpinolene itself and structurally related analogues of terpinolene, such as 1-isopropyl-4-methyl-1,4-cyclohexadiene and 1-isopropyl-4-methyl-1,3-cyclohexadiene. Terpinolene; which has a CAS Registry ID of 586-62-9, has the following structure:

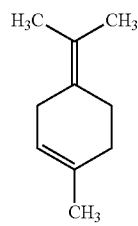

The terpinolene-based radical chain transfer agent may also be a mixture of compounds. The terpinolene-based radical chain transfer agent may be added to the polymerisable composition in an amount from 0.01 percent to 2 percent by weight based on the total weight of the polymerisable organic composition. The skilled person will appreciate that the actual amount of terpinolene-based radical chain transfer agent used can be determined taking into account a number of factors, including the specific acrylate or methacylate monomers used, the thermal free radical initiator used, the photochromic compound, as well as the amounts of each of the components in the polymerisable composition.

We have observed that polymerisation of compositions containing terpinolene results in the formation of optical elements that are uniform when tested under standard test conditions (i.e. polariscope and shadowscope) and also show good photochromic speeds. In contrast, polymerisation of compositions that do not contain terpinolene results in the formation of optical elements that are not uniform under the same test conditions and/or have slower photochromic speeds.

Thermal free radical initiators are heat activated catalysts that initiate the polymerisation reaction. A number of thermal free radical initiators are known in the art and can be used. Examples include: azo free radical initiators such as AIBN (azodiisobutyronitrile), 2,2'-Azobis(4-methoxy-2,4-dimethyl valeronitrile), 2,2'-Azobis(2,4-dimethyl valeronitrile), Dimethyl 2,2'-azobis(2-methylpropionate), 2,2'-Azobis(2-methylbutyronitrile), 1,11-Azobis(cyclohexane-1-carbonitrile), 2,2'-Azobis[N-(2-propenyl)-2-methylpropionamide]; dialkyl peroxide free radical initiators such as 1,1-di-(butylperoxy-3,3,5-trimethyl cyclohexane); alkyl perester free radical initiators such as TBPEH (t-butyl per-2-ethylhexanoate); diacyl peroxide free radical initiators such as benzoyl peroxide; peroxy dicarbonate radical initiators such as ethyl hexyl percarbonate; ketone peroxide initiators such as methyl ethyl ketone peroxide, bis(t-butyl peroxide)diisopropylbenzene, t-butylperbenzoate, t-butyl peroxy neodecanoate, and combinations thereof. Further examples of organic peroxide free radical initiators include: Dilauroyl peroxide, 2,2-Di(4,4-di(tert-butylperoxy)cyclohexyl)propane, Di(tert-butylperoxyisopropyl)benzene, Di(4-tert-butylcyclohexyl) peroxydicarbonate, Dicetyl peroxydicarbonate, Dimyristyl peroxydicarbonate, 2,3-Dimethyl-2,3-diphenylbutane, Dicumyl peroxide, Dibenzoyl peroxide, Diisopropyl peroxydicarbonate, tert-Butyl monoperoxymaleate, 2,5-Dimethyl-2,5-di(tert-butylperoxy)hexane, tert-Butylperoxy 2-ethylhexyl carbonate, tert-Amyl peroxy-2-ethylhexanoate, tert-Amyl peroxypivalate, tert-Amylperoxy 2-ethylhexyl carbonate, 2,5-Dimethyl-2,5-di(2-ethylhexanoylperoxy) hexane 2,5-Dimethyl-2,5-di(tert-butylperoxy)hexpe-3, Di(3-methoxybutyl)peroxydicarbonate, Diisobutyryl peroxide, tert-Butyl peroxy-2-ethylhexanoate (Trigonox 21S),1,1-Di (tert-butylperoxy)cyclohexane, tert-Butyl peroxyneodecanoate, tert-Butyl peroxypivalate, tert-Butyl peroxyneoheptanoate, tert-Butyl peroxydiethylacetate, 1,1-Di(tert-butylperoxy)-3,3,5-trimethylcyclohexane, 3,6,9-Triethyl-3,6,9-trimethyl-1,4,7-triperoxonane, Di(3,5,5-trimethylhexanoyl)peroxide, tert-Butyl peroxy-3,5,5-trimethyl hexanoate, 1,1,3,3-Tetramethylbutyl peroxy-2-ethylhexanoate, 1,1,3,3-Tetramethylbutyl peroxyneodecanoate, tert-Butyl peroxy-3,5,5-trimethyl hexanoate, Cumyl peroxyneodecanoate, Di-tert-butyl peroxide, tert-Butylperoxy isopropyl carbonate, tert-Butyl peroxybenzoate, Di(2-ethylhexyl)peroxydicarbonate, tert-Butyl peroxyacetate, Isopropylcumyl hydroperoxide, and tert-Butyl cumyl peroxide.

The composition and/or the thermally cured optical element may contain additional conventional adjuvants that impart desired properties or characteristics to the optical element, or which enhance the performance of the optical element. Such adjuvants include, but are not limited to, light stabilisers, UV absorbers, heat stabilisers, tints, dyes, free radical scavengers, plasticisers, flow additives, antioxidants, and other processing aids. UV absorbers may include, for example, members or derivatives of a benzophenone class, a benzotriazole class, a cyanoacrylate class or a triazine class. Commercially available UV absorbers may include, for example Chimassorb 81 or Tinuvin 81/213/234/326/328/329/360/571/1577/P (from Ciba).

The composition may further include a light stabiliser. Hindered amine light stabilisers (HALS) are available commercially. HALS are derivatives of 2,2,6,6-tetramethyl piperidine and are extremely efficient stabilizers against light-induced degradation of most polymers and photochromic dyes. An exemplary example of a suitable light stabiliser is Tinuvin 765, which is available from Ciba. Other examples of HALS include Chimassorb 2020/944, Tinuvin 111/123/494/622/770/783/791/B75/NOR 371/XT 833/XT 850.

The polymerisable composition may further include one or more antioxidants. In some embodiments, the one or more antioxidants may improve the quality and/or durability of the optical element formed from the polymerisable composition. The one or more antioxidants may include a primary antioxidant (e.g. a butylated hydroxytoluene (BHT) or a hindered phenol) and/or a secondary antioxidant (e.g. a phosphite or thioester). Commercially available antioxidants include, for example, Irganox 1010, Irganox 1076, Irganox 245, Irganox 1035, Irganox 8225, Irganox B900, Irgafos 126, Irgafos P-EPQ, Irgafos 168, and Irgafos 38. The antioxidant may be used in the polymerisable composition in a concentration of 0.01 to 0.5 parts by weight of the polymerisable composition. Preferably, the antioxidant will be used in the polymerisable composition in a concentration of approximately 0.1 parts by weight of the polymerisable composition.

The composition may further include a small quantity of a permanent dye (i.e. a non photochromic dye such as Solvaperm red BB). The small quantity of permanent dye may be used to minimise or mask undesired residual colour in the optical element formed from the polymerisable composition. For example, 0.01 to 0.1 parts of a 0.025% solution of a permanent dye concentrate may be used in the polymerisable composition.

The present invention also includes an optical element formed from the compositions described herein and/or produced according to any of the methods described herein. In some embodiments, the optical element is a lens (e.g. an ophthalmic lens).

The optical element may be formed by introducing the composition into an assembled mould. Methods for moulding plastic optical elements are known in the art. Prior to introducing the polymerisable composition into the mould it may be degassed. The polymerisable composition may also be filtered prior to introduction into the mould in order to remove any particulate matter that may affect the quality of the thermally cured optical element.

After the polymerisable composition has been introduced into the mould the composition is cured to form a solid optical element. In some embodiments, carefully controlling the polymerisation step allows for the production of high quality, high performance photochromic optical elements. The curing is carried out under thermal conditions, i.e. by heating the assembled mould containing the polymerisable composition and may include using a thermal gradient. For example, the thermal gradient may begin with a time period at about 50° C., after which the temperature is increased incrementally over a period of about 12 hours to a final temperature of about 120° C., and then decreased to about 70° C. or about 80° C.

Accordingly, the thermal curing step may include raising the temperature of the composition from around 50° C. to between 80° C. and 120° C. over a period of 7 to 14 hours. Optionally, the thermal curing step may include as a final step, maintaining the temperature of the composition at between about 70° C. and 80° C. for 0.5 to 2 hours.

An exemplary the thermal curing step may include:

heating the composition at 52° C. for 3 hours;

heating the composition from 52° C. to 53.5° C. over 1.5 hours;

heating the composition from 53.5° C. to 62.5° C. over 4.5 hours;

heating the composition from 62.5° C. to 80° C. over 4 hours; and maintaining the temperature at 80° C. for 8 hours.

It will be appreciated that minor variations to the above thermal curing step may also be contemplated and are within the scope of the present invention.

After cooling, the cured optical element may be removed from the mould and subjected to further processes, if desired. For example, other coatings known in the art may be coated onto the optical element. For example, one or more coatings that provide abrasion and scratch resistance can be coated onto the optical element. Suitable abrasion resistant coating materials are known in the art and include polyfunctional acrylic hard coatings, urethane-based hard coatings, alkyl-based coatings, siloxane based hard coatings or other organic or inorganic/organic hard coatings.

The term "photochromic speed" as used herein in relation to the fading of a photochromic optical element, refers to the time taken for the optical density of the optical element to fade to a predetermined fraction of an activated value. Accordingly, the term "$T_{3/4}$", as used herein in relation to fading of a photochromic optical element, refers to the time taken for the optical density of the lens to decrease by 75% from an activated state.

In some embodiments, optical elements produced according to the present invention may have a photochromic $T_{3/4}$ fade time of less than 300 seconds or a photochromic $T_{3/4}$ fade time of less than 250 seconds.

DESCRIPTION OF EMBODIMENTS

Examples of materials and methods for use with the compositions and methods of the present invention will now be provided. In providing these examples, it is to be understood that the specific nature of the following description is not to limit the generality of the above description.

Each of the examples provided herein were used to produce optical elements from each of the following mould assemblies:

| Mould assemblies |
| --- |
| Moulds for 15 mm thick semifinished lens |
| Moulds for 10 mm thick semifinished lens |
| Moulds for +4.00 stock lens |
| Moulds for −2.00 stock lens |
| Moulds for 2 mm plano |

Example 1

A polymerisable composition containing the following components was prepared as described below:

| Component Type | Component Name (commercial source) | Parts |
| --- | --- | --- |
| Photochromic dye | Reversacol midnight gray (James Robinson) | 0.13 |
| Monomer | NK Ester 9G (Shin Nakamura Chemical) | 45 |
| Monomer | NS110 (Akzo Chemie) | 50 |
| Monomer | *NK Oligo U-4HA (Shin Nakamura Chemical) | 5 |
| Cure modifier | Terpinolene | 0.4 |
| Light stabiliser | **Tinuvin 765 (Ciba) | 0.05 |
| Thermal initiator | ***Trigonox 21S (Akzo) | 1.0 |

*NK Oligo U-4HA is an urethane monomer having 4 terminal acrylic or methacrylic groups.
**Tinuvin 765 is a hindered Amine light stabilizer.
***Trigonox 21S is a thermal free radical initiator.

The photochromic dye was dissolved for 8 hours in the monomers before the thermal initiator was added. After degassing and filtration, the mould assemblies were filled with the monomer mix and cured in an oven with the following heating profile:

| Curing step | Curing program |
| --- | --- |
| Step 1 | Start at 52 degree C. |
| Step 2 | Hold at 52 degree C. for 2 hours |
| Step 3 | Heat up to 56 degree C. in 4 hours |
| Step 4 | Heat up to 60 degree C. in 2 hours |
| Step 5 | Heat up to 65 degree C. in 2 hours |
| Step 6 | Heat up to 80 degree C. in 3.5 hours |
| Step 7 | Heat up to 120 degree C. in 1 hours |
| Step 8 | Hold at 120 degree C. for 2 hours |
| Step 9 | Cool down to 70 degree C. in 1 hour |

The cured lenses from each mould assembly were uniform under polariscope and shadowscope. There were no optical distortions in the material and the photochromic speed was good. The lenses gave a bluish gray colour when activated in the sun light.

Example 2

A polymerisable composition containing the following components was prepared as described below:

| Component Type | Component Name (commercial source) | Parts |
| --- | --- | --- |
| Photochromic dye | Reversacol Pacific blue (James Robinson) | 0.08 |
| Photochromic dye | Reversacol Sunflower (James Robinson) | 0.017 |
| Monomer | NK Ester 2G (Shin Nakamura Chemical) | 45 |
| Monomer | Light Ester 14 EG (Kyoeisha Chemical) | 35 |
| Monomer | NK Oligo U-2PPA (Shin Nakamura Chemical) | 20 |
| Cure modifier | Terpinolene | 0.5 |
| Light stabilizer | Tinuvin 765 | 0.05 |
| Thermal initiator | Trigonox 21S | 0.4 |

Of these components, Reversacol Pacific blue is a blue photochromic dye Reversacol Sunflower is a yellow photochromic dye, NK Ester 2G is a Diethylene glycol dimethacrylate, Light Ester 14 EG is a polyethylene glycol dimethacrylate And NK Oligo U-2PPA is a urethane diacrylate.

The photochromic dyes were dissolved in NK Ester 2G first for three hours, then the remaining components were added in and stirred. After degassing and filtration, the monomer mix was filled in the mould assemblies and cured in the oven with the following heating profile.

| Curing step | Curing program |
| --- | --- |
| Step 1 | Start at 52 degree C. |
| Step 2 | Hold at 52 degree C. for 3 hours |
| Step 3 | Heat up to 53.5 degree C. in 1.5 hours |
| Step 4 | Heat up to 62.5 degree C. in 4.5 hours |
| Step 5 | Heat up to 80 degree C. in 4 hours |
| Step 6 | Heat up to 90 degree C. in 3.5 hours |
| Step 7 | Hold at 90 degree C. for 2 hours |
| Step 8 | Cool down to 80 degree C. in 1 hour |
| Step 9 | Hold at 80 degree C. for 1.5 hours |

The cured lenses from each mould assembly were uniform under polariscope and shadowscope. There were no optical distortions in the material and the photochromic speed was good. The lenses gave a gray colour when activated in the sun light.

Example 3

A polymerisable composition containing the following components was prepared as described below:

| Component Type | Component Name (commercial source) | Parts |
| --- | --- | --- |
| Photochromic dye | Reversacol midnight gray (James Robinson) | 0.13 |
| Photochromic dye | Reversacol corn yellow (James Robinson) | 0.04 |
| Monomer | NK Ester 2G | 40 |
| Monomer | NK Ester 14G | 40 |
| Monomer | NK Oligo U-2PPA | 20 |
| Cure modifier | Terpinolene | 0.5 |
| Light stabilizer | Tinuvin 765 | 0.05 |
| Thermal initiator | Trigonox 21S | 1.0 |

Reversacol midnight gray is a blue photochromic dye and Reversacol corn yellow is a yellow photochromic dye.

The photochromic dyes were dissolved in NK Ester 2G first for three hours, then the remaining components were added in and stirred. After degassing and filtration, the monomer mix was filled in the mould assemblies and cured in the oven with the following heating profile:

| Curing step | Curing program |
| --- | --- |
| Step 1 | Start at 52 degree C. |
| Step 2 | Hold at 52 degree C. for 3 hours |

| Curing step | Curing program |
|---|---|
| Step 3 | Heat up to 53.5 degree C. in 1.5 hours |
| Step 4 | Heat up to 62.5 degree C. in 4.5 hours |
| Step 5 | Heat up to 80 degree C. in 3.5 hours |
| Step 6 | Hold at 80 degree C. for 1 hours |
| Step 7 | Heat up to 120 degree C. in 5 hours |
| Step 8 | Hold at 120 degree C. for 2 hours |
| Step 9 | Cool down to 80 degree C. in 1 hour |

The cured lenses from each mould assembly were uniform under polariscope and shadowscope. There were no optical distortions in the material and the photochromic speed was good. The lenses gave a gray colour when activated in the sun light.

Example 4

A polymerisable composition containing the following components was prepared as described below:

| Component Type | Component Name | Parts |
|---|---|---|
| Photochromic dye | Reversacol Pacific blue | 0.08 |
| Photochromic dye | Reversacol sunflower | 0.017 |
| Monomer | NK Ester 2G | 36 |
| Monomer | Light Ester 14 EG | 31 |
| Monomer | NK Oligo U-2PPA | 33 |
| Cure modifier | Terpinolene | 0.5 |
| Light stabiliser | Tinuvin 765 | 0.05 |
| Thermal initiator | Trigonox 21S | 0.4 |

The photochromic dyes were dissolved in NK Ester 2G first for three hours, then the remaining components were added in and stirred. After degassing and filtration, the monomer mix was filled in the mould assemblies and cured in an oven with the following heating profile:

| Curing step | Curing program |
|---|---|
| Step 1 | Start at 52 degree C. |
| Step 2 | Hold at 52 degree C. for 3 hours |
| Step 3 | Heat up to 53.5 degree C. in 1.5 hours |
| Step 4 | Heat up to 62.5 degree C. in 4.5 hours |
| Step 5 | Heat up to 80 degree C. in 4 hours |
| Step 6 | Heat up to 90 degree C. in 3.5 hours |
| Step 7 | Hold at 90 degree C. for 2 hours |
| Step 8 | Cool down to 80 degree C. in 1 hour |
| Step 9 | Hold at 80 degree C. for 1.5 hours |

The cured lenses from each mould assembly were uniform under polariscope and shadowscope. There were no optical distortions in the material and the photochromic speed was good. The lenses gave a gray colour when activated in the sun light.

Example 5

A polymerisable composition containing the following components was prepared as described below:

| Component Type | Component Name (commercial source) | Parts |
|---|---|---|
| Photochromic dye | Reversacol Pacific blue (James Robinson) | 0.08 |
| Photochromic dye | Reversacol sunflower (James Robinson) | 0.017 |
| Monomer | NK Ester 2G (Shin Nakamura Chemical) | 50 |
| Monomer | Light Ester 14 EG (Kyoeisha Chemical) | 30 |
| Monomer | NK Oligo U-2PPA (Shin Nakamura Chemical) | 20 |
| Cure modifier | Terpinolene | 0.5 |
| Light stabiliser | Tinuvin 765 | 0.05 |
| Thermal initiator | Trigonox 21S | 0.4 |

Of these components: Reversacol Pacific blue is a blue photochromic dye; Reversacol Sunflower is a yellow photochromic dye; NK Ester 2G is a Diethylene glycol dimethacrylate; Light Ester 14 EG is a polyethylene glycol dimethacrylate; and NK Oligo U2 PPA is a urethane diacrylate.

The photochromic dyes were dissolved in NK Ester 2G first for three hours, then the remaining components were added in and stirred. After degassing and filtration, the monomer mix was filled in the moulds assemblies and cured in the oven with the following heating profile:

| Curing step | Curing program |
|---|---|
| Step 1 | Start at 52 degree C. |
| Step 2 | Hold at 52 degree C. for 3 hours |
| Step 3 | Heat up to 53.5 degree C. in 1.5 hours |
| Step 4 | Heat up to 62.5 degree C. in 4.5 hours |
| Step 5 | Heat up to 80 degree C. in 4 hours |
| Step 6 | Heat up to 90 degree C. in 3.5 hours |
| Step 7 | Hold at 90 degree C. for 2 hours |
| Step 8 | Cool down to 80 degree C. in 1 hour |
| Step 9 | Hold at 80 degree C. for 1.5 hours |

The cured lenses from each mould assembly were uniform under polariscope and shadowscope. There were no optical distortions in the material and the photochromic speed was good. The lenses gave a gray colour when activated in the sun light.

Example 6

A polymerisable composition containing the following components was prepared as described below:

| Component Type | Component Name (commercial source) | Parts |
|---|---|---|
| Photochromic dye | CNN16 (Tokuyama) | 0.013 |
| Photochromic dye | CNN12 (Tokuyama) | 0.0075 |
| Photochromic dye | CNN13 (Tokuyama) | 0.04 |
| Photochromic dye | CNN15 (Tokuyama) | 0.0075 |
| Photochromic dye | CNN14 (Tokuyama) | 0.0075 |
| Cure modifier | Terpinolene | 0.5 |
| Light Stabiliser | *Tinuvin 765 (CIBA) | 0.05 |
| Permanent dye | red dye concentrate including 0.025% Solvaperm red BB (Clariant) in NK ester 2G | 0.04 |
| monomer | NK ester 2G | 50 |
| monomer | NK ester 14G | 30 |
| monomer | **NK Oligo U-2PPA (Shin Nakamura Chemical) | 20 |
| Thermal initiator | Trigonox 21S | 0.31 |

*Tinuvin 765 is a hindered amine light stabiliser (HALS) and is a mixture of Bis(1,2,2,6,6-pentamethyl-4-piperidyl)sebacate and methyl 1,2,2,6,6-pentamethyl-4-piperidyl sebecate.
**NK Oligo U-2PPA is a monomer, which has following chemical structure:

-continued

| Component Type | Component Name (commercial source) | Parts |
|---|---|---|

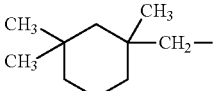

The monomer mix was prepared based on the above formulation. After stirring, degassing and filtration the monomer mix was filled into the mould/gasket assemblies.

The assemblies were placed in an oven to be cured using the following curing profile:

| Curing step | Curing program |
|---|---|
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

This formulation and curing profile were suitable for producing thick semifinished lens blanks and thin stock lenses. The produced lenses from each mould assembly had good quality and the casting yield was high. The lenses are gray photochromic lenses and the basic material properties of such produced lenses are as follows:

| | Values |
|---|---|
| Material properties | |
| Refractive Index (d line) | 1.5046 |
| Abbe number | 54 |
| Density | 1.21 g/cm$^3$ |
| Shrinkage | 10% |
| Monomer Viscosity | 72 cps |
| Rimless tensile strength (2 mm planos) | 20.9 kg |
| Impact strength (2.2 mm, −2.00 lenses, AR coated, no primer) | Passed FDA impact test |
| Static load test (1.8 mm CT) | Pass |
| Heat deflection temperature | 58.8° C. |
| Tg | 112° C. |
| Barcol Hardness | 76.2 |
| Photochromic properties | |
| Initial T % | 90.2% |
| Fully activated T % | 10.6% |
| Photochromic speed, $T_{3/4}$ fade (seconds) | 200 seconds |

In this example, and the following examples, initial T % and fully activated T % relate to optical transmission test results of the optical elements maintained in dark or light conditions. The tests were performed as specified in EN1836:1997 and ISO 8980-3, with a conditioning beam (as specified in the standard) being set to 50 klux. All lenses were tested at 23° C.

Example 7

A polymerisable composition containing the following components was prepared as described below:

| Component Type | Component Name | Parts |
|---|---|---|
| Photochromic dye | CNN16 | 0.013 |
| Photochromic dye | CNN12 | 0.0075 |
| Photochromic dye | CNN13 | 0.04 |
| Photochromic dye | CNN15 | 0.0075 |
| Photochromic dye | CNN14 | 0.0075 |
| Cure modifier | Terpinolene | 0.5 |
| Light Stabiliser | Tinuvin 765 | 0.05 |
| Permanent dye | red dye concentrate(0.025% Solvaperm red BB in NK ester 9G) | 0.03 |
| monomer | NK ester 2G | 30 |
| monomer | *Light Ester 1.9ND (Kyoeisha Chemical) | 10 |
| monomer | NK ester 9G | 30 |
| monomer | NK Oligo U-2PPA | 30 |
| Thermal initiator | Trigonox 21S | 0.31 |

*Light Ester 1.9 ND is a monomer with the chemical name of 1.9 Nonanediol dimethacrylate The monomer mix was prepared based on the above formulation. After stirring, degassing and filtration the monomer mix was filled into the mould/gasket assemblies. The assemblies were placed in an oven to be cured using the following curing profile:

| Curing step | Curing program |
|---|---|
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

This formulation and curing profile were suitable for producing thick semifinished lens blanks and stock lenses. The produced lenses from each mould assembly had good quality and the casting yield was high. The lenses are gray photochromic lenses and the basic material properties of such produced lenses are as follows:

| | Value |
|---|---|
| Material properties | |
| Refractive Index (d line) | 1.5020 |
| Abbe number | 54 |
| Density | 1.20 g/cm$^3$ |
| Shrinkage | 10.5% |
| Monomer Viscosity | 47 cps |
| Rimless tensile strength (2 mm planos) | 22 kg |
| Impact strength (2.2 mm, −2.00, AR no primer) | Passed FDA impact test |
| Static load test (1.8 mm CT) | pass |
| Heat deflection temperature | 57.3° C. |
| Tg | 94° C. |
| Barcol Hardness | 76.5 |
| Photochromic properties | |
| Initial T % | 89.6% |
| Fully activated T % | 8.4% |
| Photochromic speed, $T_{3/4}$ fade (seconds) | 211 seconds |

Example 8

A polymerisable composition containing the following components was prepared as described below:

| Component Type | Component Name | Parts |
| --- | --- | --- |
| Photochromic dye | CNN16 | 0.013 |
| Photochromic dye | CNN12 | 0.005 |
| Photochromic dye | CNN13 | 0.04 |
| Photochromic dye | CNN15 | 0.0075 |
| Photochromic dye | CNN14 | 0.01 |
| Cure modifier | Terpinolene | 0.5 |
| Light Stabiliser | Tinuvin 765 | 0.05 |
| Permanent dye | red dye concentrate(0.025% Solvaperm red BB in NK ester 9G) | 0.03 |
| monomer | NK ester 2G | 35 |
| monomer | NK ester 9G | 20 |
| monomer | *NK ester LA (Shin-Nakamura Chemical) | 10 |
| monomer | NK Oligo U-2PPA | 35 |
| Thermal initiator | Trigonox 21S | 0.4 |

*NK ester LA is a monomer with the chemical name of n-Lauryl methacrylate.

In this formulation, a mono functional methacrylate n-Lauryl methacrylate was used. The monomer mix was prepared using above formulation. After stirring, degassing and filtration, the monomer mix was filled into the mould assemblies. The mould assemblies were placed in an oven and cured using the following curing profile:

| Curing step | Curing program |
| --- | --- |
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

The lenses generated in this method from each mould assembly have good and balanced lens properties. Both thick semi-finished and thin stock lenses can be cast using this method and formulation without problems. The lenses are gray photochromic lenses and the basic material properties of such achieved lenses are listed in following table:

| | Value |
| --- | --- |
| Material properties | |
| Refractive Index (d line) | 1.501 |
| Abbe number | 51 |
| Density | 1.173 |
| Rimless tensile strength (2 mm planos) | 20.1 kg |
| Impact strength (2.2 mm, −2.00, AR no primer) | Passed FDA impact test |
| Static load test (1.8 mm CT) | Pass |
| Heat deflection temperature | 62.4° C. |
| Tg | 98.6° C. |
| Barcol Hardness | 72.7 |
| Photochromic properties | |
| Initial T % | 90.1% |
| Fully activated T % | 7.1% |
| Photochromic speed, $T_{3/4}$ fade (seconds) | 193 seconds |

Example 9

A polymerisable composition containing the following components was prepared as described below:

| Component Type | Component Name (commercial source) | Parts |
| --- | --- | --- |
| Photochromic dye | CNN16 | 0.013 |
| Photochromic dye | CNN12 | 0.0075 |
| Photochromic dye | CNN13 | 0.04 |
| Photochromic dye | CNN15 | 0.0075 |
| Photochromic dye | CNN14 | 0.0075 |
| Cure modifier | Terpinolene | 0.5 |
| Light Stabiliser | Tinuvin 765 | 0.05 |
| Permanent dye | red dye concentrate (0.025% Solvaperm red BB in NK ester 2G) | 0.04 |
| monomer | NK ester 2G | 45 |
| monomer | NK ester 9PG (Shin-Nakamura Chemical) | 35 |
| monomer | NK Oligo U-2PPA | 20 |
| Thermal initiator | Trigonox 21S | 0.31 |

NK ester 9PG is a monomer with the chemical name of Polypropylene glycol #400 dimethacrylate.
The chemical structure for this monomer is:

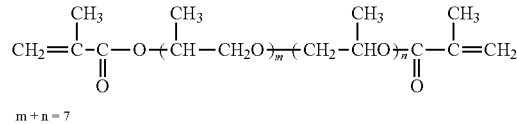

m + n = 7

The monomer mix was prepared using above formulation. After stirring, degassing and filtration, the monomer mix was filled into the moulds assemblies. The moulds assemblies were placed in an oven and cured using the following curing profile:

| Curing step | Curing program |
| --- | --- |
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

The lenses generated in this method from each mould assembly have good and balanced lens properties. Both thick semi-finished and thin stock lenses can be cast using this method and formulation without problems. The lenses are gray photochromic lenses and the basic material properties of such achieved lenses are listed in following table:

| | Value |
| --- | --- |
| Material properties | |
| Refractive Index (d line) | 1.4971 |
| Abbe number | 56 |
| Density | 1.168 g/cm³ |
| Rimless tensile strength (2 mm planos) | 21 kg |
| Impact strength (2.2 mm, −2.00, AR coated, no primer) | Pass FDA impact testing |
| Static load test (1.8 mm CT) | pass |
| Heat deflection temperature | 62.1° C. |
| Tg | 100.5° C. |
| Barcol Hardness | 77.6 |
| Photochromic properties | |
| Initial T % | 89.3% |

-continued

| | Value |
|---|---|
| Fully activated T % | 8.0% |
| Photochromic speed, $T_{3/4}$ fade (seconds) | 209 seconds |

Example 10

A polymerisable composition identical to Example 7 was produced, except that it contained 0.005% extra UV absorber Tinuvin 329 (from CIBA). Lenses were formed following the methods set out in Example 7.

The chemical name for the UV absorber used in this example is 2-(2H-benzotriazol-2-yl)-4-(1,1,3,3-tetramethyl-butyl)phenol.

The resulting lenses from each mould assembly were gray photochromic lenses and the quality was good. The photochromic performance of the lenses is as follows:

| | |
|---|---|
| Initial T % | 90.1% |
| Fully activated T % | 12.4% |
| Photochromic speed, $T_{3/4}$ fade (seconds) | 164 seconds |

The resulting lenses had a Barcol hardness of 78.7.

Example 11

A polymerisable composition containing the following components was prepared as described below:

| Component Type | Component Name | Parts |
|---|---|---|
| Photochromic dye | CNN16 | 0.025 |
| Photochromic dye | CNN17 (Tokuyama) | 0.005 |
| Photochromic dye | CNN11 (Tokuyama) | 0.0125 |
| Photochromic dye | CNN12 | 0.00625 |
| Photochromic dye | CNN13 | 0.0375 |
| Cure modifier | Terpinolene | 0.5 |
| Light Stabiliser | Tinuvin 765 | 0.05 |
| monomer | NK ester 2G | 30 |
| monomer | Light Ester 1.9ND | 10 |
| monomer | NK ester 9G | 30 |
| monomer | NK Oligo U-2PPA | 30 |
| Thermal initiator | Trigonox 21S | 0.31 |

In this formulation, the brown dye package from Tokuyama was used.

The monomer mix was prepared based on the above formulation. After stirring, degassing and filtration the monomer mix was filled into the mould/gasket assemblies. The assemblies were placed in the oven to be cured using the following curing profile:

| Curing step | Curing program |
|---|---|
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

This formulation and curing profile were suitable for producing thick semi-finished lens blanks and stock lenses. The lenses produced from each mould assembly were brown photochromic lenses, which were of good quality and the casting yield was high. The photochromic properties of the lenses are as follows:

| | |
|---|---|
| Initial T % | 90.7% |
| Fully activated T % | 13.8% |
| Photochromic speed, $T_{3/4}$ fade (seconds) | 156 seconds |

The resulting lenses had a Barcol hardness of 76.2.

Comparative Example 1

A polymerisable composition containing the following components was prepared as described below:

| Component Type | Component Name | Parts |
|---|---|---|
| Photochromic dye | Reversacol midnight gray | 0.13 |
| Monomer | NK Ester 9G | 45 |
| Monomer | NS110 | 50 |
| Monomer | NK Oligo U4HA | 5 |
| Light stabilizer | Tinuvin 765 | 0.05 |
| Thermal initiator | Trigonox 21S | 1.0 |

The photochromic dye was dissolved for 8 hours in the monomers before the thermal initiator was added. After degassing and filtration, the mould assemblies were filled with the monomer mix and cured in an oven with the following heating profile used:

| Curing step | Curing program |
|---|---|
| Step 1 | Start at 52 degree C. |
| Step 2 | Hold at 52 degree C. for 2 hours |
| Step 3 | Heat up to 56 degree C. in 4 hours |
| Step 4 | Heat up to 60 degree C. in 2 hours |
| Step 5 | Heat up to 65 degree C. in 2 hours |
| Step 6 | Heat up to 80 degree C. in 3.5 hours |
| Step 7 | Heat up to 120 degree C. in 1 hours |
| Step 8 | Hold at 120 degree C. for 2 hours |
| Step 9 | Cool down to 70 degree C. in 1 hour |

This comparative example did not use terpinolene in the formulation. The lenses obtained were not uniform under polariscope and shadowscope and there were a lot of strains in the lenses. They were not considered to be good lenses.

Comparative Example 2

A polymerisable composition containing the following components was prepared as described below:

| Component Type | Component Name | Parts |
|---|---|---|
| Photochromic dye | Reversacol Pacific blue | 0.08 |
| Photochromic dye | Reversacol sunflower | 0.017 |
| Monomer | NK Ester 2G | 45 |
| Monomer | Light Ester 14 EG | 35 |
| Monomer | NK Oligo U-2PPA | 20 |
| Light stabilizer | Tinuvin 765 | 0.05 |
| Thermal initiator | Trigonox 21S | 0.4 |

The photochromic dyes were dissolved in NK Ester 2G first for three hours, then the remaining components were added in and stirred. After degassing and filtration, the monomer mix was filled in the mould assemblies and cured in the oven with the following heating profile:

| Curing step | Curing program |
| --- | --- |
| Step 1 | Start at 52 degree C. |
| Step 2 | Hold at 52 degree C. for 3 hours |
| Step 3 | Heat up to 53.5 degree C. in 1.5 hours |
| Step 4 | Heat up to 62.5 degree C. in 4.5 hours |
| Step 5 | Hold at 90 degree C. for 2 hours |
| Step 6 | Cool down to 80 degree C. in 1 hour |
| Step 7 | Hold at 80 degree C. for 1.5 hours |

This comparative example did not use terpinolene in the formulation. The lenses obtained were not uniform under polariscope and shadowscope and there, were a lot of strains in the lenses. They were not considered to be good lenses.

Comparative Example 3

A polymerisable composition containing the following components was prepared as described below:

| Component Type | Component Name (commercial source) | Parts |
| --- | --- | --- |
| Photochromic dye | Reversacol midnight gray (James Robinson) | 0.13 |
| Photochromic dye | Reversacol corn yellow (James Robinson) | 0.04 |
| Monomer | NK Ester 2G | 40 |
| Monomer | NK Ester 14G | 40 |
| Monomer | NK Oligo U-2PPA | 20 |
| Light stabilizer | Tinuvin 765 | 0.05 |
| Thermal initiator | Trigonox 21S | 1.0 |

The photochromic dyes were dissolved in NK Ester 2G first for three hours, then the remaining components were added in and stirred. After degassing and filtration, the monomer mix was filled in the mould assemblies and cured in an oven with the following heating profile:

| Curing step | Curing program |
| --- | --- |
| Step 1 | Start at 52 degree C. |
| Step 2 | Hold at 52 degree C. for 3 hours |
| Step 3 | Heat up to 53.5 degree C. in 1.5 hours |
| Step 4 | Heat up to 62.5 degree C. in 4.5 hours |
| Step 5 | Heat up to 80 degree C. in 3.5 hours |
| Step 6 | Hold at 80 degree C. for 1 hours |
| Step 7 | Heat up to 120 degree C. in 5 hours |
| Step 8 | Hold at 120 degree C. for 2 hours |
| Step 9 | Cool down to 80 degree C. in 1 hour |

This comparative example did not use terpinolene in the formulation. The cured lenses had optical distortions and were not uniform under polariscope and shadowscope. They were not considered to be useable as lenses.

Comparative Example 4

A polymerisable composition containing the following components was prepared as described below:

| Component Type | Component Name | Parts |
| --- | --- | --- |
| Photochromic dye | Reversacol Pacific blue | 0.08 |
| Photochromic dye | Reversacol sun flower | 0.017 |
| Monomer | NK Ester 2G | 36 |
| Monomer | Light Ester 14 EG | 31 |
| Monomer | NK Oligo U-2PPA | 33 |
| Light stabilizer | Tinuvin 765 | 0.05 |
| Thermal initiator | Trigonox 21S | 0.4 |

The photochromic dyes were dissolved in NK Ester 2G first for three hours, then the remaining components were added in and stirred. After degassing and filtration, the monomer mix was filled in the moulds assemblies and cured in an oven with the following heating profile:

| Curing step | Curing program |
| --- | --- |
| Step 1 | Start at 52 degree C. |
| Step 2 | Hold at 52 degree C. for 3 hours |
| Step 3 | Heat up to 53.5 degree C. in 1.5 hours |
| Step 4 | Heat up to 62.5 degree C. in 4.5 hours |
| Step 5 | Heat up to 80 degree C. in 4 hours |
| Step 6 | Heat up to 90 degree C. in 3.5 hours |
| Step 7 | Hold at 90 degree C. for 2 hours |
| Step 8 | Cool down to 80 degree C. in 1 hour |
| Step 9 | Hold at 80 degree C. for 1.5 hours |

This comparative example did not use terpinolene in the formulation. The lenses obtained were not uniform under polariscope and shadowscope. The photochromic speed of the lenses was also much slower than the equivalent lenses produced using terpinolene.

Comparative Example 5

A polymerisable composition containing the following components was prepared as described below:

| Component Type | Component Name | Parts |
| --- | --- | --- |
| Photochromic dye | Reversacol Pacific blue | 0.08 |
| Photochromic dye | Reversacol sunflower | 0.017 |
| Monomer | NK ester 2G | 50 |
| Monomer | Light ester 14 EG | 30 |
| Monomer | NK Oligo U2 PPA | 20 |
| Light stabilizer | Tinuvin 765 | 0.05 |
| Thermal initiator | Trigonox 21S | 0.4 |

The photochromic dyes were dissolved in NK Ester 2G first for three hours, then the remaining components were added in and stirred. After degassing and filtration, the monomer mix was filled in the moulds assemblies and cured in an oven with the following heating profile:

| Curing step | Curing program |
| --- | --- |
| Step 1 | Start at 52 degree C. |
| Step 2 | Hold at 52 degree C. for 3 hours |
| Step 3 | Heat up to 53.5 degree C. in 1.5 hours |
| Step 4 | Heat up to 62.5 degree C. in 4.5 hours |
| Step 5 | Hold at 90 degree C. for 2 hours |
| Step 6 | Cool down to 80 degree C. in 1 hour |
| Step 7 | Hold at 80 degree C. for 1.5 hours |

This comparative example did not use terpinolene in the formulation. The cured lenses were not uniform under polariscope and shadowscope and there were also a lot of strains in the lenses. These were not considered to be good lenses.

Comparative Example 6

A polymerisable composition containing the following components was prepared as described below:

| Component Type | Component Name | Parts |
| --- | --- | --- |
| Photochromic dye | CNN16 | 0.013 |
| Photochromic dye | CNN12 | 0.0075 |
| Photochromic dye | CNN13 | 0.04 |
| Photochromic dye | CNN15 | 0.0075 |
| Photochromic dye | CNN14 | 0.0075 |
| Light Stabiliser | Tinuvin 765 | 0.05 |
| Permanent dye | red dye concentrate(0.025% Solvaperm red BB in NK ester 2G) | 0.04 |
| Monomer | NK ester 2G | 50 |
| Monomer | NK ester 14G | 30 |
| Monomer | NK Oligo U-2PPA | 20 |
| Thermal initiator | Trigonox 21S | 0.31 |

250 g of monomer mix was prepared based on the above formulation, the only difference between this example and example 6 is that there is no terpinolene in this example. After stirring, filtration and degassing, the monomer mix was filled into the following mould and gasket assemblies.

| Moulds assemblies |
| --- |
| Moulds for 15 mm thick semifinished lens |
| Moulds for 10 mm thick semifinished lens |
| Moulds for +4.00 stock lens |
| Moulds for −2.00 stock lens |
| Moulds for 2 mm plano |

The filled assemblies were placed in an oven and cured with the following curing cycle:

| Curing step | Curing program |
| --- | --- |
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

After curing the lenses were opened. The resulting lenses were of low quality and would not be acceptable for market. The following table summarises the quality issues of these lenses:

| Lenses | Lens quality |
| --- | --- |
| 15 mm thick semifinished lens | Massive surface defects due to the moulds separation during the curing step in the oven |
| 10 mm thick semifinished lens | Bubbles on the surface, massive surface defects. |
| +4.00 stock lens | Bubbles in the lens, massive surface defects due to the mould separation during the curing step in the oven |
| −2.00 stock lens | Surface defects |
| 2 mm plano | Surface defects |

The photochromic properties of the lenses were as follows:

| Photochromic properties | |
| --- | --- |
| Initial T % | 88.5% |
| Fully activated T % | 14.4% |
| Photochromic speed, $T_{3/4}$ fade (seconds) | 420 seconds |

The resulting lenses had a Barcol hardness of 85.4.

Not only was the lens quality poor, the photochromic properties of the lenses were also poor. The fully activated darkness was low and the photochromic fading speed was slow.

Comparative Example 7

A polymerisable composition containing the following components was prepared as described below:

| Component Type | Component Name | Parts |
| --- | --- | --- |
| Photochromic dye | CNN16 | 0.013 |
| Photochromic dye | CNN12 | 0.0075 |
| Photochromic dye | CNN13 | 0.04 |
| Photochromic dye | CNN15 | 0.0075 |
| Photochromic dye | CNN14 | 0.0075 |
| Light Stabiliser | Tinuvin 765 | 0.05 |
| Permanent dye | red dye concentrate(0.025% Solvaperm red BB in NK ester 9G) | 0.03 |
| Monomer | NK ester 2G | 30 |
| Monomer | Light Ester 1.9ND | 10 |
| Monomer | NK ester 9G | 30 |
| Monomer | NK Oligo U-2PPA | 30 |
| Thermal initiator | Trigonox 21S | 0.31 |

250 g of monomer mix was prepared based on the above formulation, the only difference between this example and Example 7 is that there is no terpinolene in this example. After stirring, filtration and degassing, the monomer mix is filled into following moulds and gasket assemblies:

| Moulds assemblies |
| --- |
| Moulds for 15 mm thick semifinished lens |
| Moulds for 10 mm thick semifinished lens |
| Moulds for +4.00 stock lens |
| Moulds for −2.00 stock lens |
| Moulds for 2 mm plano |

The filled assemblies were placed in the oven and cured with the following curing cycle:

| Curing step | Curing program |
| --- | --- |
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |

-continued

| Curing step | Curing program |
|---|---|
| Step 5 | Heat up from 62.5 to 80° C. in 4 hours |
| Step 6 | Hold at 80° C. for 8 hours |

After curing the lenses were opened. The resulting lenses were of low quality and would not be acceptable for market. The following table summarises the quality issues of these lenses:

| Lenses | Lens quality |
|---|---|
| 15 mm thick semifinished lens | Lens cracked into pieces |
| 10 mm thick semifinished lens | Massive surface defects. |
| +4.00 stock lens | Bubbles in the lens, massive surface defects due to the moulds separation during the curing step in the oven |
| −2.00 stock lens | Surface defects, lens cracked |
| 2 mm plano | Surface waves |

The photochromic properties of the lenses were as follows:

| | |
|---|---|
| Initial T % | 88.2% |
| Fully activated T % | 15.4% |
| Photochromic speed, $T_{3/4}$ fade (seconds) | 663 seconds |

The resulting lenses had a Barcol hardness of 88.3.

As shown above, the photochromic speed of the lenses is very slow, and the lenses are poor in photochromic switching performance.

Comparative Example 8

A polymerisable composition containing the following components was prepared as described below:

| Component Type | Component Name | Parts |
|---|---|---|
| Photochromic dye | CNN16 | 0.013 |
| Photochromic dye | CNN12 | 0.005 |
| Photochromic dye | CNN13 | 0.04 |
| Photochromic dye | CNN15 | 0.0075 |
| Photochromic dye | CNN14 | 0.01 |
| Light Stabiliser | Tinuvin 765 | 0.05 |
| Permanent dye | red dye concentrate(0.025% Solvaperm red BB in NK ester 9G) | 0.03 |
| Monomer | NK ester 2G | 35 |
| Monomer | NK ester 9G | 20 |
| Monomer | NK ester LA | 10 |
| Monomer | NK Oligo U-2PPA | 35 |
| Thermal initiator | Trigonox 21S | 0.4 |

250 g of monomer mix was prepared based on the above formulation, the only difference between this example and Example 8 is that there is no terpinolene in this example. After stirring, filtration and degassing, the monomer mix was filled into following mould and gasket assemblies:

| Moulds assemblies |
|---|
| Moulds for 15 mm thick semifinished lens |
| Moulds for 10 mm thick semifinished lens |
| Moulds for +4.00 stock lens |
| Moulds for −2.00 stock lens |
| Moulds for 2 mm plano |

The filled assemblies were placed in an oven and cured with the following curing cycle:

| Curing step | Curing program |
|---|---|
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

After curing the lenses were opened. The resulting lenses were of low quality and would not be acceptable for market. The following table summarises the quality issues of these lenses:

| Lenses | Lens quality |
|---|---|
| 15 mm thick semifinished lens | massive surface defects due to the moulds separation during the curing step in the oven |
| 10 mm thick semifinished lens | massive surface defects due to the moulds separation during the curing step in the oven |
| +4.00 stock lens | massive surface defects due to the moulds separation during the curing step in the oven |
| −2.00 stock lens | Surface defects |
| 2 mm plano | Surface defects |

The photochromic properties of the lenses were as follows:

| | |
|---|---|
| Initial T % | 88.4% |
| Fully activated T % | 16.9% |
| Photochromic speed, $T_{3/4}$ fade (seconds) | 888 seconds |

The resulting lenses had a Barcol hardness of 86.4.

The lenses have poor photochromic properties as the photochromic switching speed is slow.

Comparative Example 9

A polymerisable composition containing the following components was prepared as described below:

| Component Type | Component Name | Parts |
|---|---|---|
| Photochromic dye | CNN16 | 0.013 |
| Photochromic dye | CNN12 | 0.0075 |
| Photochromic dye | CNN13 | 0.04 |
| Photochromic dye | CNN15 | 0.0075 |
| Photochromic dye | CNN14 | 0.0075 |
| Cure modifier | Terpinolene | 0 |
| Light Stabiliser | Tinuvin 765 | 0.05 |
| Permanent dye | red dye concentrate(0.025% Solvaperm red BB in NK ester 2G) | 0.04 |
| Monomer | NK ester 2G | 45 |
| Monomer | NK ester 9PG | 35 |

| Component Type | Component Name | Parts |
| --- | --- | --- |
| Monomer | NK Oligo U-2PPA | 20 |
| Thermal initiator | Trigonox 21S | 0.31 |

250 g of monomer mix was prepared based on the above formulation, the only difference between this example and Example 9 is that there is no terpinolene in this example. After stirring, filtration and degassing, the monomer mix is filled into following mould and gasket assemblies:

| Moulds assemblies | Number of assemblies |
| --- | --- |
| Moulds for 15 mm thick semifinished lens | 1 |
| Moulds for 10 mm thick semifinished lens | 1 |
| Moulds for +4.00 stock lens | 1 |
| Moulds for −2.00 stock lens | 1 |
| Moulds for 2 mm plano | 1 |

The filled assemblies were placed in an oven and cured with the following curing cycle:

| Curing step | Curing program |
| --- | --- |
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

After curing the lenses were opened. The resulting lenses were of low quality and would not be acceptable for market. The following table summarises the quality issues of these lenses:

| Lenses | Lens quality |
| --- | --- |
| 15 mm thick semifinished lens | cracked |
| 10 mm thick semifinished lens | cracked |
| +4.00 stock lens | Bubbles in the lens |
| −2.00 stock lens | Surface defects |
| 2 mm plano | Surface defects |

The photochromic properties of the lenses were as follows:

| Photochromic properties | |
| --- | --- |
| Initial T % | 88.0% |
| Fully activated T % | 13.1% |
| Photochromic speed, $T_{3/4}$ fade (seconds) | 557 seconds |

The resulting lenses had a Barcol hardness of 88.1.

The lenses have poor photochromic properties as the photochromic fading speed is slow.

Comparative Example 10

A polymerisable composition containing the following components was prepared as described below:

| Component Type | Component Name | Parts |
| --- | --- | --- |
| Photochromic dye | CNN16 | 0.013 |
| Photochromic dye | CNN12 | 0.0075 |
| Photochromic dye | CNN13 | 0.04 |
| Photochromic dye | CNN15 | 0.0075 |
| Photochromic dye | CNN14 | 0.0075 |
| Cure modifier | α-methyl styrene | 0.5 |
| Light Stabiliser | Tinuvin 765 | 0.05 |
| Permanent dye | red dye concentrate(0.025% Solvaperm red BB in NK ester 2G) | 0.04 |
| Monomer | NK ester 2G | 50 |
| Monomer | NK ester 14G | 30 |
| Monomer | NK Oligo U-2PPA | 20 |
| Thermal initiator | Trigonox 21S | 0.31 |

Instead of using Terpinolene as cure modifier, this example used α-methyl styrene in place of Terpinolene. All the other conditions were the same as Example 6.

250 g of monomer mix was prepared based on the above formulation. After stirring, filtration and degassing, the monomer mix was filled into following mould and gasket assemblies:

| Moulds assemblies |
| --- |
| Moulds for 15 mm thick semifinished lens |
| Moulds for 10 mm thick semifinished lens |
| Moulds for +4.00 stock lens |
| Moulds for −2.00 stock lens |
| Moulds for 2 mm plano |

The filled assemblies were placed in the oven and cured with the following curing cycle:

| Curing step | Curing program |
| --- | --- |
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

After curing the lenses were opened. The resulting lenses were of low quality and would not be acceptable for market. The following table summarises the quality issues of these lenses:

| Lenses | Lens quality |
| --- | --- |
| 15 mm thick semifinished lens | massive surface defects due to the moulds separation during the curing step in the oven |
| 10 mm thick semifinished lens | Cracked |
| +4.00 stock lens | cracked |
| −2.00 stock lens | Surface defects |
| 2 mm plano | Surface defects |

The photochromic properties of the lenses were as follows:

| | |
| --- | --- |
| Initial T % | 88.1% |
| Fully activated T % | 14.4% |
| Photochromic speed, $T_{3/4}$ fade (seconds) | 463 seconds |

The resulting lenses had a Barcol hardness of 86.5.

The lenses have poor photochromic properties as the photochromic speed is slow.

Comparative Example 11

A polymerisable composition containing the following components was prepared as described below:

| Component Type | Component Name | Parts |
| --- | --- | --- |
| Photochromic dye | CNN16 | 0.013 |
| Photochromic dye | CNN12 | 0.0075 |
| Photochromic dye | CNN13 | 0.04 |
| Photochromic dye | CNN15 | 0.0075 |
| Photochromic dye | CNN14 | 0.0075 |
| Cure modifier | α-methyl styrene | 0.5 |
| Light Stabiliser | Tinuvin 765 | 0.05 |
| Permanent dye | red dye concentrate(0.025% Solvaperm red BB in NK ester 9G) | 0.03 |
| Monomer | NK ester 2G | 30 |
| Monomer | Light Ester 1.9ND | 10 |
| Monomer | NK ester 9G | 30 |
| Monomer | NK Oligo U-2PPA | 30 |
| Thermal initiator | Trigonox 21S | 0.31 |

Instead of using Terpinolene as cure modifier, this example used α-methyl styrene in place of Terpinolene. All the other conditions were the same as Example 7.

250 g of monomer mix was prepared based on the above formulation. After stirring, filtration and degassing, the monomer mix is filled into following mould and gasket assemblies:

| Moulds assemblies |
| --- |
| Moulds for 15 mm thick semifinished lens |
| Moulds for 10 mm thick semifinished lens |
| Moulds for +4.00 stock lens |
| Moulds for −2.00 stock lens |
| Moulds for 2 mm plano |

The filled assemblies were placed in an oven and cured with the following curing cycle:

| Curing step | Curing program |
| --- | --- |
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

After curing the lenses were opened. The resulting lenses were of low quality and would not be acceptable for market. The following table summarises the quality issues of these lenses:

| Lenses | Lens quality |
| --- | --- |
| 15 mm thick semifinished lens | Massive cracks |
| 10 mm thick semifinished lens | Massive cracks |
| +4.00 stock lens | Massive cracks |
| −2.00 stock lens | massive surface defects due to the moulds separation during the curing step in the oven |
| 2 mm plano | massive surface defects due to the moulds separation during the curing step in the oven |

The photochromic properties of the lenses were as follows:

| | |
| --- | --- |
| Initial T % | 88.1% |
| Fully activated T % | 17.1% |
| Photochromic speed, $T_{3/4}$ fade (seconds) | 725 seconds |

The resulting lenses had a Barcol hardness of 86.5.

The lenses have poor photochromic properties as the photochromic switching speed is very slow.

Comparative Example 12

A polymerisable composition containing the following components was prepared as described below:

| Component Type | Component Name | Parts |
| --- | --- | --- |
| Photochromic dye | CNN16 | 0.013 |
| Photochromic dye | CNN12 | 0.005 |
| Photochromic dye | CNN13 | 0.04 |
| Photochromic dye | CNN15 | 0.0075 |
| Photochromic dye | CNN14 | 0.01 |
| Cure modifier | α-methyl styrene | 0.5 |
| Light Stabiliser | Tinuvin 765 | 0.05 |
| Permanent dye | red dye concentrate(0.025% Solvaperm red BB in NK ester 9G) | 0.03 |
| Monomer | NK ester 2G | 35 |
| Monomer | NK ester 9G | 20 |
| Monomer | NK ester LA | 10 |
| Monomer | NK Oligo U-2PPA | 35 |
| Thermal initiator | Trigonox 21S | 0.4 |

Instead of using Terpinolene as a cure modifier, this example used α-methyl styrene. All the other conditions were similar to Example 8.

250 g of monomer mix was prepared based on the above formulation. After stirring, filtration and degassing, the monomer mix was filled into following mould and gasket assemblies:

| Moulds assemblies |
| --- |
| Moulds for 15 mm thick semifinished lens |
| Moulds for 10 mm thick semifinished lens |
| Moulds for +4.00 stock lens |
| Moulds for −2.00 stock lens |
| Moulds for 2 mm plano |

The filled assemblies were placed in the oven and cured with the following curing cycle:

| Curing step | Curing program |
| --- | --- |
| Step 1 | Start at 52° C. |
| Step 2 | Hold at 52° C. for 3 hours |
| Step 3 | Heat up from 52 to 53.5° C. in 1.5 hours |

-continued

| Curing step | Curing program |
|---|---|
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

After curing the lenses were opened. The resulting lenses were of low quality and would not be acceptable for market. The following table summarises the quality issues of these lenses:

| Lenses | Lens quality |
|---|---|
| 15 mm thick semifinished lens | Massive cracks |
| 10 mm thick semifinished lens | Massive cracks |
| +4.00 stock lens | massive surface defects due to the moulds separation during the curing step in the oven |
| −2.00 stock lens | massive surface defects due to the moulds separation during the curing step in the oven |
| 2 mm plano | massive surface defects due to the moulds separation during the curing step in the oven |

The photochromic properties of the lenses were as follows:

| | |
|---|---|
| Initial T % | 86.8% |
| Fully activated T % | 16.0% |
| Photochromic speed, $T_{3/4}$ fade (seconds) | 833 seconds |

The resulting lenses had a Barcol hardness of 87.3.

The lenses have poor photochromic properties as the photochromic switching speed is very slow.

Comparative Example 13

A polymerisable composition containing the following components was prepared as described below:

| Component Type | Component Name | Parts |
|---|---|---|
| Photochromic dye | CNN16 | 0.013 |
| Photochromic dye | CNN12 | 0.0075 |
| Photochromic dye | CNN13 | 0.04 |
| Photochromic dye | CNN15 | 0.0075 |
| Photochromic dye | CNN14 | 0.0075 |
| Cure modifier | α-methyl styrene | 0.5 |
| Light Stabiliser | Tinuvin 765 | 0.05 |
| Permanent dye | red dye concentrate(0.025% Solvaperm red BB in NK ester 2G) | 0.04 |
| Monomer | NK ester 2G | 45 |
| Monomer | NK ester 9PG | 35 |
| Monomer | NK Oligo U-2PPA | 20 |
| Thermal initiator | Trigonox 21S | 0.31 |

Instead of using Terpinolene as cure modifier, this example used α-methyl styrene. All the other conditions were similar to Example 9.

250 g of monomer mix was prepared based on the above formulation. After stirring, filtration and degassing, the monomer mix was filled into the following mould and gasket assemblies

| Moulds assemblies |
|---|
| Moulds for 15 mm thick semifinished lens |
| Moulds for 10 mm thick semifinished lens |
| Moulds for +4.00 stock lens |
| Moulds for −2.00 stock lens |
| Moulds for 2 mm plano |

The filled assemblies were placed in the oven and cured with the following curing cycle:

| Curing step | Curing program |
|---|---|
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

After curing the lenses were opened. The resulting lenses were of low quality and would not be acceptable for market. The following table summarises the quality issues of these lenses:

| Lenses | Lens quality |
|---|---|
| 15 mm thick semifinished lens | A 2 cm long crack, massive surface defects |
| 10 mm thick semifinished lens | massive surface defects due to the moulds separation during the curing step in the oven |
| +4.00 stock lens | massive surface defects due to the moulds separation during the curing step in the oven |
| −2.00 stock lens | massive surface defects due to the moulds separation during the curing step in the oven |
| 2 mm plano | massive surface defects due to the moulds separation during the curing step in the oven |

The photochromic properties of the lenses were as follows:

| | |
|---|---|
| Initial T % | 87.8% |
| Fully activated T % | 13.4% |
| Photochromic speed, $T_{3/4}$ fade (seconds) | 549 seconds |

The resulting lenses had a Barcol hardness of 89.1.

The lenses have poor photochromic properties as the photochromic switching speed is slow.

Comparative Example 14

A polymerisable composition containing the following components was prepared as described below:

| Component Type | Component Name | Parts |
|---|---|---|
| Photochromic dye | CNN16 | 0.013 |
| Photochromic dye | CNN12 | 0.0075 |
| Photochromic dye | CNN13 | 0.04 |
| Photochromic dye | CNN15 | 0.0075 |
| Photochromic dye | CNN14 | 0.0075 |
| Cure modifier | 1-dodecane thiol | 0.5 |
| Light Stabiliser | Tinuvin 765 | 0.05 |

-continued

| Component Type | Component Name | Parts |
|---|---|---|
| Permanent dye | red dye concentrate(0.025% Solvaperm red BB in NK ester 2G) | 0.04 |
| Monomer | NK ester 2G | 50 |
| Monomer | NK ester 14G | 30 |
| Monomer | NK Oligo U-2PPA | 20 |
| Thermal initiator | Trigonox 21S | 0.31 |

Instead of using Terpinolene as cure modifier, this example used 1-dodecane thiol. All the other conditions were similar to Example 6.

250 g of monomer mix was prepared based on the above formulation. After stirring, filtration and degassing, the monomer mix was filled into the following mould and gasket assemblies:

| Moulds assemblies |
|---|
| Moulds for 15 mm thick semifinished lens |
| Moulds for 10 mm thick semifinished lens |
| Moulds for +4.00 stock lens |
| Moulds for −2.00 stock lens |
| Moulds for 2 mm plano |

The filled assemblies were placed in the oven and cured with the following curing cycle:

| Curing step | Curing program |
|---|---|
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

After curing the lenses were opened. The resulting lenses were of low quality and would not be acceptable for market. The following table summarises the quality issues of these lenses:

| Lenses | Lens quality |
|---|---|
| 15 mm thick semifinished lens | A 3 cm long crack, massive surface defects |
| 10 mm thick semifinished lens | A 2 cm long crack, massive surface defects |
| +4.00 stock lens | A 5 cm long crack, massive surface defects |
| −2.00 stock lens | surface defects due to the moulds separation during the curing step in the oven |
| 2 mm plano | surface defects due to the moulds separation during the curing step in the oven |

The photochromic properties of the lenses were as follows:

| | |
|---|---|
| Initial T % | 87.7% |
| Fully activated T % | 14.7% |
| Photochromic speed, $T_{3/4}$ fade (seconds) | 446 seconds |

The resulting lenses had a Barcol hardness of 87.2.

The lenses have poor photochromic properties as the photochromic switching speed is slow.

Comparative Example 15

A polymerisable composition containing the following components was prepared as described below:

| Component Type | Component Name | Parts |
|---|---|---|
| Photochromic dye | CNN16 | 0.013 |
| Photochromic dye | CNN12 | 0.0075 |
| Photochromic dye | CNN13 | 0.04 |
| Photochromic dye | CNN15 | 0.0075 |
| Photochromic dye | CNN14 | 0.0075 |
| Cure modifier | 1-dodecane thiol | 0.5 |
| Light Stabiliser | Tinuvin 765 | 0.05 |
| Permanent dye | red dye concentrate(0.025% Solvaperm red BB in NK ester 9G) | 0.03 |
| Monomer | NK ester 2G | 30 |
| Monomer | Light Ester 1.9ND | 10 |
| Monomer | NK ester 9G | 30 |
| Monomer | NK Oligo U-2PPA | 30 |
| Thermal initiator | Trigonox 21S | 0.31 |

Instead of using Terpinolene as cure modifier, this example used 1-dodecane thiol. All the other conditions were similar to Example 7.

250 g of monomer mix was prepared based on the above formulation. After stirring, filtration and degassing, the monomer mix was filled into following mould and gasket assemblies:

| Moulds assemblies |
|---|
| Moulds for 15 mm thick semifinished lens |
| Moulds for 10 mm thick semifinished lens |
| Moulds for +4.00 stock lens |
| Moulds for −2.00 stock lens |
| Moulds for 2 mm plano |

The filled assemblies were placed in the oven and cured with the following curing cycle:

| Curing step | Curing program |
|---|---|
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

After curing the lenses were opened. The resulting lenses were of low quality and would not be acceptable for market. The following table summarises the quality issues of these lenses:

| Lenses | Lens quality |
|---|---|
| 15 mm thick semifinished lens | A 1 cm long crack, massive surface defects |
| 10 mm thick semifinished lens | three cracks in the lens, massive surface defects |

-continued

| Lenses | Lens quality |
|---|---|
| +4.00 stock lens | A 1 cm long crack, massive surface defects |
| −2.00 stock lens | Surface defects |
| 2 mm plano | surface defects |

The photochromic properties of the lenses were as follows:

| | |
|---|---|
| Initial T % | 88.3% |
| Fully activated T % | 17.0% |
| Photochromic speed, $T_{3/4}$ fade (seconds) | 724 seconds |

The resulting lenses had a Barcol hardness of 88.2.

The lenses have poor photochromic properties as the photochromic switching speed is very slow.

Comparative Example 16

A polymerisable composition containing the following components was prepared as described below:

| Component Type | Component Name | Parts |
|---|---|---|
| Photochromic dye | CNN16 | 0.013 |
| Photochromic dye | CNN12 | 0.005 |
| Photochromic dye | CNN13 | 0.04 |
| Photochromic dye | CNN15 | 0.0075 |
| Photochromic dye | CNN14 | 0.01 |
| Cure modifier | 1-dodecane thiol | 0.5 |
| Light Stabiliser | Tinuvin 765 | 0.05 |
| Permanent dye | red dye concentrate(0.025% Solvaperm red BB in NK ester 9G) | 0.03 |
| Monomer | NK ester 2G | 35 |
| Monomer | NK ester 9G | 20 |
| Monomer | NK ester LA | 10 |
| Monomer | NK Oligo U-2PPA | 35 |
| Thermal initiator | Trigonox 21S | 0.4 |

Instead of using Terpinolene as cure modifier, this example used 1-dodecane thiol. All the other conditions were similar to Example 8.

250 g of monomer mix was prepared based on the above formulation. After stirring, filtration and degassing, the monomer mix was filled into the following mould and gasket assemblies:

| Mould assemblies |
|---|
| Moulds for 15 mm thick semifinished lens |
| Moulds for 10 mm thick semifinished lens |
| Moulds for +4.00 stock lens |
| Moulds for −2.00 stock lens |
| Moulds for 2 mm plano |

The filled assemblies were placed in the oven and cured with the following curing cycle:

| Curing step | Curing program |
|---|---|
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

After curing the lenses were opened. The resulting lenses were of low quality and would not be acceptable for market. The following table summarises the quality issues of these lenses:

| Lenses | Lens quality |
|---|---|
| 15 mm thick semifinished lens | A 1 cm long crack, massive surface defects |
| 10 mm thick semifinished lens | three cracks in the lens, massive surface defects |
| +4.00 stock lens | A 1 cm long crack, massive surface defects |
| −2.00 stock lens | Surface defects |
| 2 mm plano | surface defects |

The photochromic properties of the lenses were as follows:

| Photochromic properties | |
|---|---|
| Initial T % | 87.7% |
| Fully activated T % | 17.4% |
| Photochromic speed, $T_{3/4}$ fade (seconds) | 956 seconds |

The resulting lenses had a Barcol hardness of 87.1.

The lenses have poor photochromic properties as the photochromic switching speed is slow.

Comparative Example 17

A polymerisable composition containing the following components was prepared as described below:

| Component Type | Component Name | Parts |
|---|---|---|
| Photochromic dye | CNN16 | 0.013 |
| Photochromic dye | CNN12 | 0.0075 |
| Photochromic dye | CNN13 | 0.04 |
| Photochromic dye | CNN15 | 0.0075 |
| Photochromic dye | CNN14 | 0.0075 |
| Cure modifier | 1-dodecane thiol | 0.5 |
| Light Stabiliser | Tinuvin 765 | 0.05 |
| Permanent dye | red dye concentrate(0.025% Solvaperm red BB in NK ester 2G) | 0.04 |
| Monomer | NK ester 2G | 45 |
| Monomer | NK ester 9PG | 35 |
| Monomer | NK Oligo U-2PPA | 20 |
| Thermal initiator | Trigonox 21S | 0.31 |

Instead of using Terpinolene as cure modifier, this example used 1-dodecane thiol. All the other conditions were similar to Example 9.

250 g of monomer mix was prepared based on the above formulation. After stirring, filtration and degassing, the monomer mix was filled into the following mould and gasket assemblies:

| Mould assemblies |
| --- |
| Moulds for 15 mm thick semifinished lens |
| Moulds for 10 mm thick semifinished lens |
| Moulds for +4.00 stock lens |
| Moulds for −2.00 stock lens |
| Moulds for 2 mm plano |

The filled assemblies were placed in an oven and cured with the following curing cycle:

| Step Number | Step Description |
| --- | --- |
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

After curing the lenses were opened. The resulting lenses were of low quality and would not be acceptable for market. The following table summarises the quality issues of these lenses:

| Lenses | Lens quality |
| --- | --- |
| 15 mm thick semifinished lens | massive cracks, massive surface defects |
| 10 mm thick semifinished lens | massive surface defects |
| +4.00 stock lens | Massive surface ring marks |
| −2.00 stock lens | One separation mark on the lens front surface |
| 2 mm plano | Lens was okay |

The photochromic properties of the lenses were as follows:

| | |
| --- | --- |
| Initial T % | 87.5% |
| Fully activated T % | 15.5% |
| Photochromic speed, $T_{3/4}$ fade (seconds) | 670 seconds |

The resulting lenses had a Barcol hardness of 89.5.

The lenses have poor photochromic properties as the photochromic switching speed was very slow.

Comparative Example 18

A polymerisable composition containing the following components was prepared as described below:

| Component Type | Component Name | Parts |
| --- | --- | --- |
| Cure modifier | Terpinolene | 0.5 |
| Light Stabiliser | Tinuvin 765 | 0.05 |
| Permanent dye | red dye concentrate(0.025% Solvaperm red BB in NK ester 2G) | 0.04 |
| Monomer | NK ester 2G | 50 |
| Monomer | NK ester 14G | 30 |
| Monomer | NK Oligo U-2PPA | 20 |
| Thermal initiator | Trigonox 21S | 0.31 |

Monomer mix was prepared based on above formulation. The monomer mix was filled into mould assemblies and curing in an oven with the following curing profile:

| Curing step | Curing program |
| --- | --- |
| Step 1 | Start at 52° C. |
| Step 2 | Hold at 52° C. for 3 hours |
| Step 3 | Heat up from 52 to 53.5° C. in 1.5 hours |
| Step 4 | Heat up from 53.5 to 62.5° C. in 4.5 hours |
| Step 5 | Heat up from 62.5 to 80° C. in 4 hours |
| Step 6 | Hold at 80° C. for 8 hours |

After curing the lenses were opened. The resulting lenses had a Barcol hardness of 76.5 and no photochromic activity. In order to achieve photochromic activity, another expensive process step has to be introduced to add the photochromic activity into these lenses. These extra steps could be the application of photochromic coating or performance of photochromic imbibition methods. However, these are undesirable as they significantly increase the cost of the process.

Summary of Exemplary Examples

The following table provides a summary of exemplary examples and exemplary comparative examples discussed above:

| | Comparative | Comparative | Comparative |
| --- | --- | --- | --- |
| Example 6 | Example 6 | Example 10 | Example 14 |
| 0.5% terpinolene Good lenses | No terpinolene Poor lenses | 0.5% α-methyl styrene Poor lenses | 0.5% 1-dodecane thiol Poor lenses |
| Example 7 | Comparative Example 7 | Comparative Example 11 | Comparative Example 15 |
| 0.5% terpinolene Good lenses | No terpinolene Poor lenses | 0.5% α-methyl styrene Poor lenses | 0.5% 1-dodecane thiol Poor lenses |
| Example 8 | Comparative Example 8 | Comparative Example 12 | Comparative Example 16 |
| 0.5% terpinolene Good lenses | No terpinolene Poor lenses | 0.5% α-methyl styrene Poor lenses | 0.5% 1-dodecane thiol Poor lenses |
| Example 9 | Comparative Example 9 | Comparative Example 13 | Comparative Example 17 |
| 0.5% terpinolene Good lenses | No terpinolene Poor lenses | 0.5% α-methyl styrene Poor lenses | 0.5% 1-dodecane thiol Poor lenses |

As shown above, the use of terpinolene as a cure modifier in polymerisable compositions results in lenses of a higher quality than those without a cure modifier or those that use α-methyl styrene or 1-dodecane thiol as a cure modifier.

Those skilled in the art will appreciate that the invention described herein is susceptible to variations and modifications other than those specifically described. It is to be understood that the invention includes all such variations and modifications. The invention also includes all of the steps, features, compositions and compounds referred to, or indicated in this specification, individually or collectively, and any and all combinations of any two or more of the steps or features.

The claims defining the invention are as follows:

1. A casting composition for producing photochromic optical elements, the composition including:
   (i) an acrylate or methacrylate monomer,
   (ii) a photochromic compound, (iii) a terpinolene-based radical chain transfer agent, and
(iv) a thermal free radical initiator,
wherein the casting composition is a liquid
and wherein the acrylate or methacrylate monomer includes a combination of a urethane acrylate or methacrylate monomer and at least one of:
(a) a relatively hard polymer formed from a polyalkylene oxide acrylate or methacrylate monomer; and a relatively flexible polymer formed from a polyalkylene oxide acrylate or methacrylate monomer; or
(b) a relatively flexible polymer formed from a polyalkylene oxide acrylate or methacrylate monomer; a polypropylene glycol acrylate or methacrylate monomer; a lauryl acrylate or methacrylate monomer; or a isostearyl acrylate or methacrylate monomer; and a relatively hard polymer formed from a bisphenol A ethoxylated diacrylate or methacrylate.

2. A composition according to claim 1, wherein the one or more monomers include one or more monoacrylates, monomethacrylates, diacrylates, dimethacrylates, triacrylates or trimethacrylates.

3. A composition according to claim 1, wherein the urethane acrylate or a urethane methacrylate monomer includes one or more monomers selected from the group consisting of: a urethane monomer with 4 terminal arylate or methacylic groups, a urethane monomer with 6 terminal arylate or methacylic groups, and a monomer of the following structure:

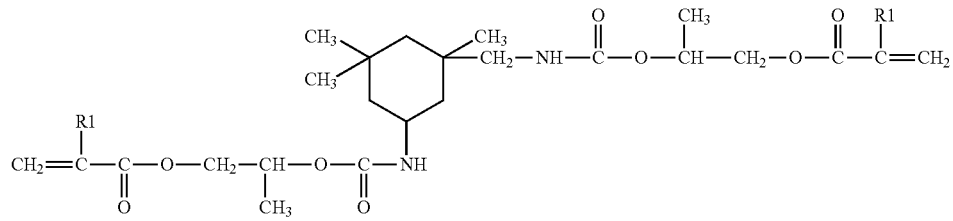

wherein R1 represents a hydrogen atom or a methyl group.

4. A composition according to claim 1, wherein the acrylate or methacrylate monomer includes a combination of:
a relatively hard polymer formed from a polyalkylene oxide acrylate or methacrylate monomer;
a relatively flexible polymer formed from a polyalkylene oxide acrylate or methacrylate monomer; and
a urethane acrylate or methacrylate monomer.

5. A composition according to claim 4, wherein the relatively hard polymer is formed from diethyleneglycol dimethacrylate.

6. A composition according to claim 4, wherein the relatively flexible polymer is formed from a monomer having 14 alkyleneoxide units per monomer molecule.

7. A composition according to claim 4, wherein the relatively flexible polymer is formed from polyethylene glycol 600 dimethacrylate.

8. A composition according to claim 4, wherein the composition includes:
20 to 60 parts by weight of the polymerisable composition of a polyethylene glycol di(meth)acrylate monomer of formula (I):

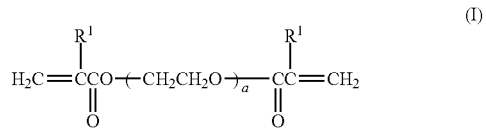

wherein $R^1$ is a hydrogen atom or a methyl group, and a is an integer selected from the group consisting of 2 to 4;

15 to 60 parts by weight of the polymerisable composition of a polyethylene glycol di(meth)acrylate monomer of formula (II):

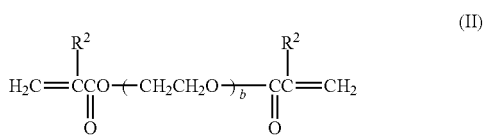

wherein $R^2$ is a hydrogen atom or a methyl group, and b is an integer selected from the group consisting of 5 to 20;

up to 40 parts by weight of the polymerisable composition of a urethane (meth)acrylate monomer;

0.02 to 0.2 parts by weight of the polymerisable composition of the photochromic compound;

0.1 to 1.0 parts by weight of the polymerisable composition of the terpinolene-based radical chain transfer agent; and 0.1 to 1.5 parts by weight of the polymerisable composition of the thermal free radical initiator.

9. A composition according to claim 8, wherein the composition further comprises 5 to 20% parts by weight of the polymerisable composition of 1.9 nonanediol dimethacrylate.

10. A composition according to claim 8, wherein the composition further comprises 5 to 20% parts by weight of the polymerisable composition of n-Lauryl methacrylate.

11. A composition according to claim 4, wherein the composition includes:
30 to 50 parts by weight of the polymerisable composition a polyethylene glycol di(meth)acrylate monomer of formula (I):

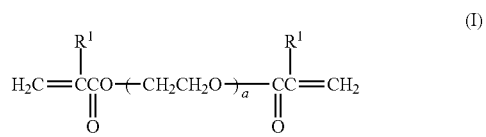

wherein R¹ is a hydrogen atom or a methyl group, and a is an integer selected from the group consisting of 2 to 4;

30 to 60 parts by weight of the polymerisable composition of a polypropylene glycol di(meth)acrylate monomer of formula (II):

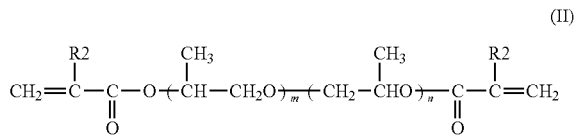

(II)

wherein R2 represents a hydrogen atom or a methyl group, and m and n are integers that together add up to 7;

up to 40 parts by weight of the polymerisable composition of a urethane (meth)acrylate monomer;

0.02 to 0.2 parts by weight of the polymerisable composition of the photochromic compound;

0.1 to 1.0 parts by weight of the polymerisable composition of the terpinolene-based radical chain transfer agent; and 0.1 to 1.5 parts by weight of the polymerisable composition of the thermal free radical initiator.

12. A composition according to claim 1, wherein the acrylate or methacrylate monomer includes a combination of:
   a relatively flexible polymer formed from a polyalkylene oxide acrylate or methacrylate monomer; a polypropylene glycol acrylate or methacrylate monomer; a lauryl acrylate or methacrylate monomer; or a isostearyl acrylate or methacrylate monomer;
   a relatively hard polymer formed from a bisphenol A ethoxylated diacrylate or methacrylalte; and
   a urethane acrylate or methacrylate monomer.

13. A composition according to claim 12, wherein the relatively flexible polymer is formed from a monomer having 9 alkyleneoxide units per monomer molecule.

14. A composition according to claim 12, wherein the relatively flexible polymer is formed from polyethylene glycol 400 dimethacrylate or a similar monomer.

15. A composition according to claim 12, wherein the relatively flexible polymer is formed from polypropylene glycol 400 deimethacrylate or a similar monomer.

16. A composition according to claim 12, wherein the composition includes:
   30 to 60 parts by weight of a polymerisable composition polyethylene glycol di(meth)acrylate monomer of formula (II):

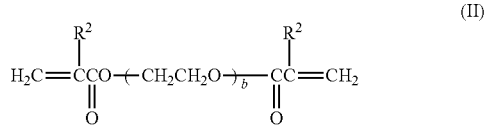

(II)

wherein R² is a hydrogen atom or a methyl group, and b is an integer selected from the group consisting of 5 to 20, 30 to 60 parts by weight of a bisphenol A ethoxylated di(meth)acrylate;

up to 40 parts by weight of the polymerisable composition of a urethane (meth)acrylate monomer;

0.02 to 0.2 parts by weight of the polymerisable composition of the photochromic compound;

0.1 to 1.0 parts by weight of the polymerisable composition of the terpinolene-based radical chain transfer agent; and 0.1 to 1.5 parts by weight of the polymerisable composition of the thermal free radical initiator.

17. A composition according to claim 1, wherein the photochromic compound includes one or more photochromic compounds selected from the group consisting of: spironaphthoxazines; spiropyrans, naphthopyrans; triarylmethanes, stilbenes, azastilbenes, nitrones, fulgides, spiropyrans, spiro-oxazines, quinones; and chromenes.

18. A composition according to claim 1, wherein the terpinolene-based radical chain transfer agent includes one or more chain transfer agents selected from the group consisting of: terpinolene, 1-isopropyl-4-methyl-1,4-cyclohexadiene, and 1-isopropyl-4-methyl-1,3-cyclohexadiene.

19. A composition according to claim 1, wherein the terpinolene-based radical chain transfer agent is added to the polymerisable composition in an amount from 0.01 percent to 2 percent by weight based on the total weight of the polymerisable composition.

20. A composition according to claim 1, wherein the terpinolene-based radical chain transfer agent is added to the polymerisable composition in an amount from 0.01 percent to 1 percent by weight based on the total weight of the polymerisable composition.

21. A composition according to claim 1, wherein the thermal free radical initiator includes an organic peroxide thermal free radical initiator or an azo free radical initiator.

22. A composition according to claim 1, wherein the thermal free radical initiator includes tert-Butyl peroxy-2-ethylhexanoate.

23. A composition according to claim 1, wherein the composition contains one or more additional adjuvants.

24. A composition according to claim 23, wherein the one or more additional adjuvants include a light stabiliser and/or UV absorber.

25. A composition according to claim 24, wherein the light stabiliser includes a hindered amine light stabilizer.

26. A composition according to claim 24, wherein the UV absorber includes a member or derivate of a benzophenone class, benzotriazole class, cyanoacrylate class, triazine class, or a combination of any of the foregoing.

27. A composition according to claim 23, wherein the one or more additional adjuvants include an antioxidant.

28. A composition according to claim 27, wherein the antioxidant includes a butylated hydroxytoluene (BHT), a hindered phenol, a phosphate, a thioester or a combination of any of the foregoing.

29. A composition according to claim 23, wherein the one or more additional adjuvants include a permanent dye.

30. A composition according to claim 29, wherein the permanent dye is included in a quantity to mask residual colour in the composition and/or optical element without otherwise colouring the composition and/or optical element.

31. A composition according to claim 1, wherein the composition is suitable for forming photochromic optical elements with a Barcol hardness of between 60 and 80.

32. A composition according to claim 1, wherein the composition is suitable for forming photochromic optical elements with a photochromic $T_{3/4}$ fade time less than 300 seconds.

33. A composition according to claim 1, wherein the composition is suitable for forming photochromic optical elements with a photochromic $T_{3/4}$ fade time less than 250 seconds.

34. A composition according to claim 1, wherein the composition is suitable for forming first and second crack-free and surface defect-free photochromic optical elements with centre thickness between 1.5 mm and 17 mm, wherein the centre thickness of the first optical element is at least 6 mm greater than that of the second optical element.

35. A composition according to claim 1, wherein the composition is suitable for forming first and second crack-free and surface defect-free photochromic optical elements with centre thickness between 1.5 mm and 17 mm, wherein the centre thickness of the first optical element is at least 12 mm greater than that of the second optical element.

36. A process for the manufacture of a photochromic optical element, the process including:

introducing the composition according to claim 1 into a mould; and subjecting the composition to a thermal curing step to provide a solid photochromic optical element wherein the thermal curing step includes raising the temperature of the composition from around 50° C. to between 80° C. and 120° C. over a period of 7 to 14 hours.

37. A process according to claim 36, wherein the thermal curing step includes:

heating the composition at 52° C. for 3 hours;

heating the composition from 52° C. to 53.5° C. over 1.5 hours;

heating the composition from 53.5° C. to 62.5° C. over 4.5 hours;

heating the composition from 62.5° C. to 80° C. over 4 hours; and maintaining the temperature at 80° C. for 8 hours.

38. An optical element formed from a composition according to claim 1 or according to a process of claim 36.

39. An optical element according to claim 38, wherein the optical element is a lens.

40. An optical element according to claim 39, wherein the lens is an ophthalmic lens.

41. An optical element according to claim 38, wherein the optical element has a photochromic $T_{3/4}$ fade time less than 300 seconds.

42. An optical element according to claim 38, wherein the optical element has a photochromic $T_{3/4}$ fade time less than 250 seconds.

43. An optical element according to claim 38, wherein the optical element has a Barcol hardness of between 60 and 80.

44. An optical element according to claim 38, wherein the optical element has a centre thickness of between 1.5 mm and 17 mm.

* * * * *